(12) United States Patent
Huang et al.

(10) Patent No.: US 11,303,483 B1
(45) Date of Patent: Apr. 12, 2022

(54) TRANSMISSION DEVICE AND TRANSMISSION METHOD

(71) Applicant: FUJITSU LIMITED, Kawasaki (JP)

(72) Inventors: Guoxiu Huang, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/369,733

(22) Filed: Jul. 7, 2021

(30) Foreign Application Priority Data

Nov. 27, 2020 (JP) .............................. JP2020-196968

(51) Int. Cl.
*H04L 25/49* (2006.01)
*H04L 25/497* (2006.01)
*H04L 25/08* (2006.01)

(52) U.S. Cl.
CPC .......... *H04L 25/4975* (2013.01); *H04L 25/08* (2013.01)

(58) Field of Classification Search
CPC .............................. H04L 25/4975; H04L 25/08
See application file for complete search history.

(56) References Cited

U.S. PATENT DOCUMENTS 7,483,481 B1 * 1/2009 Ghobrial ........... H04L 25/03343
348/607
2013/0330082 A1 12/2013 Alonso et al.

FOREIGN PATENT DOCUMENTS

JP 2013-258694 A 12/2013

* cited by examiner

*Primary Examiner* — Curtis B Odom
(74) *Attorney, Agent, or Firm* — Staas & Halsey LLP

(57) ABSTRACT

A transmission device includes an imparter configured to impart redundant data to the beginning of each of a plurality of data blocks divided from a data signal, a plurality of THP operators configured to parallelly precode the plurality of data blocks to which the redundant data is imparted, a transmitter configured to sequentially transmit the plurality of data blocks precoded by the plurality of THP operators and the redundant data imparted to each of the plurality of data blocks to a transmission line according to an arrangement order in the data signal, wherein the plurality of THP operators feed back a plurality of pieces of the redundant data to the plurality of data blocks, respectively.

10 Claims, 20 Drawing Sheets

TRANSMISSION DEVICE AND TRANSMISSION METHOD

CROSS-REFERENCE TO RELATED APPLICATION

This application is based upon and claims the benefit of priority of the prior Japanese Patent Application No. 2020-196968 filed on Nov. 27, 2020, the entire contents of which are incorporated herein by reference.

FIELD

A certain aspect of the embodiments is related to a transmission device and a transmission method.

BACKGROUND

For example, there is THP (Tomlinson-Harashima Precoding) as a technique for reducing inter-symbol interference (ISI) due to a limitation of a transmission band. The THP is widely used in wireless communication technology, and the application to optical transmission technology has been researched and developed (see Japanese Laid-open Patent Publications No. 2013-258694).

SUMMARY

According to an aspect of the present disclosure, there is provided a transmission device including: an imparter configured to impart redundant data to the beginning of each of a plurality of data blocks divided from a data signal; a plurality of THP operators configured to parallelly precode the plurality of data blocks to which the redundant data is imparted; a transmitter configured to sequentially transmit the plurality of data blocks precoded by the plurality of THP operators and the redundant data imparted to each of the plurality of data blocks to a transmission line according to an arrangement order in the data signal; wherein the plurality of THP operators feed back a plurality of pieces of the redundant data to the plurality of data blocks, respectively.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, when implementing a THP function in a DSP (Digital Signal Processor), it is considered that a plurality of THP operation units that precode a plurality of data blocks divided from the data signal in parallel are provided in order to match a processing speed of precoding by the DSP to a transmission rate of the data signal to be transmitted. Each of the THP operation units feeds back forward data on the time series of the data block to backward data via a tap.

However, since the respective THP operation units execute precoding processing in parallel independently of each other, the end of the data block precoded by another THP operation unit cannot be fed back to the beginning of the data block precoded by itself. Therefore, if the data blocks are transmitted to a transmission line according to an order in the original data signal, the inter-symbol interference may occur from data near the end of the immediately preceding data block with respect to data near the beginning of each data block.

It is an object of the present disclosure to provide a transmission device and a transmission method that can reduce the inter-symbol interference of the data signal precoded in parallel every data blocks.

(Transmission System)

Figure 1:
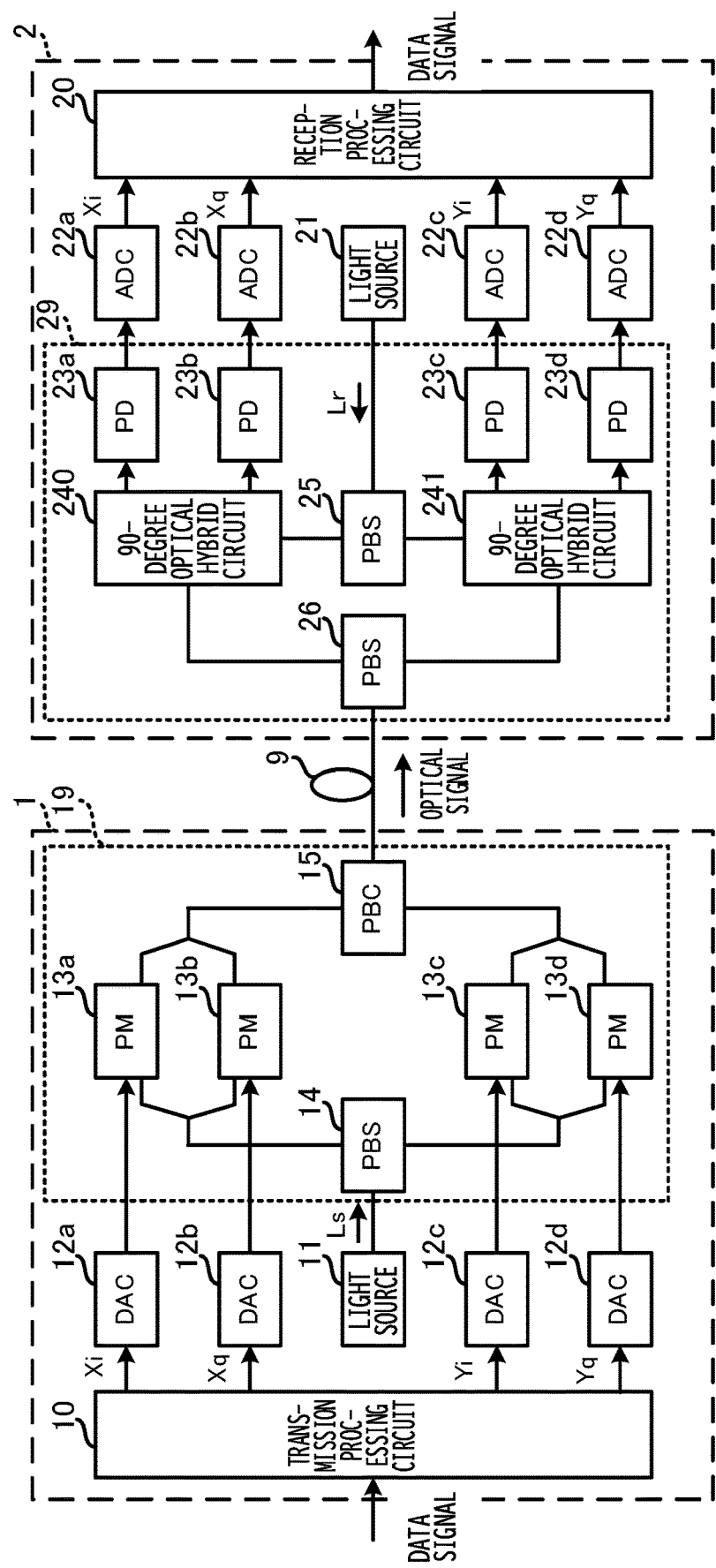
FIG. 1 is a block diagram illustrating an example of an optical transmission system.

FIG. 1 is a block diagram illustrating an example of an optical transmission system. The optical transmission system has a transmitting device 1 and a receiving device 2 which are connected to each other via a transmission line 9 such as an optical fiber. The transmitting device 1 is an example of a transmission device. An optical signal transmitted from the transmitting device 1 is transmitted to the receiving device 2 via the transmission line 9, and the receiving device 2 receives the optical signal transmitted according to a digital coherent optical transmission method.

Here, the operation of the transmitting device 1 described below is an example of a transmission method.

The transmitting device 1 generates the optical signal in which an X-polarization and a Y-polarization orthogonal to each other are combined, from a data signal accommodated in an Ethernet (registered trademark) frame or the like. The transmitting device 1 includes a transmission processing circuit 10, a light source 11, DACs (Digital-to-Analog Converters) 12a to 12d, and an optical transmission unit 19. The optical transmission unit 19 includes phase modulators (PM) 13a to 13d, a polarization beam splitter (PBS) 14, and a polarization beam combiner (PBC) 15. The optical transmission unit 19 transmits the optical signal to the transmission line 9.

The transmission processing circuit 10 generates electric field signals Xi, Xq, Yi, Yq by modulating the data signals input from other devices using a multi-level modulation scheme (hereinafter referred to as "modulation scheme") such as 64QAM (Quadrature Amplitude Modulation), and outputs the electric field signals to DACs 12a to 12d, respectively. The electric field signals Xi, Xq, Yi, and Yq indicate the electric field information of the optical signal. The electric field signals Xi and Xq are the I and Q components of the X-polarization of the optical signal, and the electric field signals Yi and Yq are the I and Q components of the Y-polarization of the optical signal. The transmission processing circuit 10 is, for example, a DSP (Digital Signal Processor), but is not limited to this, and may be, for example, an FPGA (Field Programmable Gate Array) or an ASIC (Application Specific Integrated Circuit).

The DACs 12a to 12d convert the electric field signals Xi, Xq, Yi, and Yq from digital signals to analog signals, respectively. The electric field signals Xi, Xq, Yi, and Yq are input to the PM 13a to 13d, respectively. The DACs 12a to 12d may be provided inside the transmission processing circuit 10.

The light source 11 is, for example, an LD (Laser Diode), and outputs transmission light Ls having a predetermined frequency to the PBS 14. The PBS 14 separates the transmission light Ls into polarization components on the X-axis and Y-axis (polarization axis). An X-polarization component of the transmission light Ls is input to each of the PMs 13a and 13b, and a Y-polarization component of the transmission light Ls is input to each of the PMs 13c and 13d.

The PM 13a to 13d optically modulate the transmission light Ls by the electric field signals Xi, Xq, Yi, and Yq converted into analog signals, respectively. More specifically, the PMs 13a and 13b perform phase modulation of the X-polarization of the transmission light Ls based on the electric field signals Xi and Xq, respectively, and the PMs 13c and 13d perform phase modulation of the Y-polarization of the transmission light Ls based on the electric field signals Yi and Yq, respectively. The X-polarization component and the Y-polarization component of the phase-modulated transmission light Ls are input to the PBC 15. The PBC 15 synthesizes the polarization of the X-polarization component and the Y-polarization component of the transmission light Ls, and outputs the synthesized result to the transmission line 9 as the optical signal.

The receiving device 2 receives the optical signal from the transmitting device 1. The receiving device 2 includes a reception processing circuit 20, a light source 21, ADCs (Analog-to-Digital Converters) 22a to 22d, and an optical reception unit 29. The optical reception unit 29 is an example of a transmission/reception unit that receives the optical signal from the transmission line 9.

The optical reception unit 29 corresponds to an optical front end, includes PD (PhotoDiode) 23a to 23d, 90-degree optical hybrid circuits 240 and 241 and PBS 25 and 26, and receives the optical signal from the transmission line 9. The PBS 26 separates the optical signal input from the transmission line 9 into the X-polarization component and the Y-polarization component, and outputs them to the 90-degree optical hybrid circuits 240 and 241, respectively.

Further, the light source 21 inputs local oscillation light Lr into the PBS 25. The PBS 25 separates the local oscillation light Lr into the X-polarization component and the Y-polarization component, and outputs them to the 90-degree optical hybrid circuits 240 and 241, respectively.

The 90-degree optical hybrid circuit 240 detects the X-polarization component of the optical signal by a waveguide that interferes with the X-polarization component of the optical signal and the X-polarization component of the local oscillation light Lr. The 90-degree optical hybrid circuit 240 outputs optical electric field components corresponding to an amplitude and a phase of an I-channel and a Q-channel to the PDs 23a and 23b, respectively, as a detection result.

The 90-degree optical hybrid circuit 241 detects the Y-polarization component of the optical signal by a waveguide that interferes with the Y-polarization component of the optical signal and the Y-polarization component of the local oscillation light Lr. The 90-degree optical hybrid circuit 241 outputs optical electric field components corresponding to the amplitude and the phase of the I-channel and the Q-channel to the PDs 23c and 23d, respectively, as a detection result.

The PDs 23a to 23d convert the optical electric field components into electric signals and output the electric signals to the ADCs 22a to 22d, respectively. The ADCs 22a to 22d convert the electric signals input from the PDs 23a to 23d into electric field signals Xi, Xq, Yi and Yq, respectively. The electric field signals Xi, Xq, Yi and Yq are input to the reception processing circuit 20.

The reception processing circuit 20 compensates for the waveform distortion caused in the optical signal by polarization mode dispersion and polarization dependent loss in the transmission line 9 based on dynamic parameters, with respect to the electric field signals Xi, Xq, Yi and Yq, and performs demodulation processing of the electric field signals Xi, Xq, Yi and Yq to restore the data signal. The reception processing circuit 20 is, for example, the DSP, but is not limited to this, and may be, for example, the FPGA or the ASIC.

Figure 2:
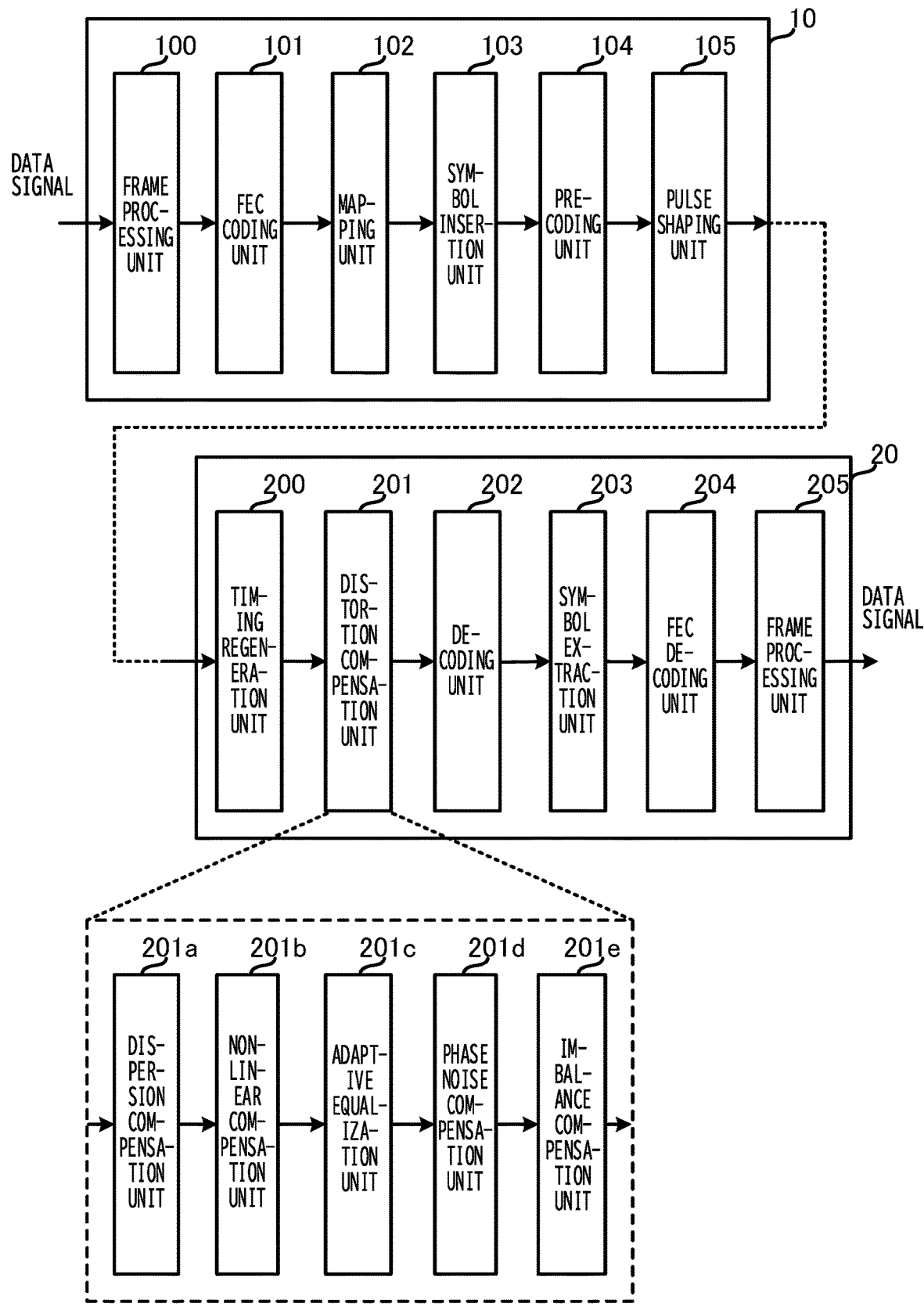
FIG. 2 is a block diagram illustrating an example of a transmission processing circuit and a reception processing circuit.

FIG. 2 is a block diagram illustrating an example of the transmission processing circuit 10 and the reception processing circuit 20. The transmission processing circuit 10 includes a frame processing unit 100, an FEC (Forward Error Correction) coding unit 101, a mapping unit 102, a symbol insertion unit 103, a precoding unit 104, and a pulse shaping unit 105.

The frame processing unit 100 extracts the data signal from, for example, an Ethernet frame, and outputs the data signal to the FEC coding unit 101. The FEC coding unit 101 encodes the data signal to generate an error correction code and impart the error correction code to the data signal. The mapping unit 102 maps the data signal input from the FEC coding unit 101 to symbols in constellation according to a multi-level modulation system such as 64QAM. The mapped data signal is output to the symbol insertion unit 103 as electric field signals Xi, Xq, Yi and Yq.

The symbol insertion unit 103 inserts, for example, training symbols and pilot symbols into the electric field signals Xi, Xq, Yi and Yq, respectively. The training symbol is used to determine a synchronization bit and an initial value of an equalizer, as an example. The pilot symbol is used, for example, in an adaptive equalization unit 201c and a phase noise compensation unit 201d, which will be described later. The training symbol and the pilot symbol are symbols obtained by modulating data having a predetermined pattern by a modulation system such as QPSK, which is lower than the number of multi-levels of the modulation system of the data signal. The symbol insertion unit 103 outputs the electric field signals Xi, Xq, Yi and Yq to the precoding unit 104.

The precoding unit 104 precodes each of the electric field signals Xi, Xq, Yi, and Yq by the THP, for example. The precoding unit 104 divides each of the electric field signals Xi, Xq, Yi and Yq into a plurality of data blocks and precodes the data blocks in parallel by a plurality of THP operation units in order to match a processing speed of precoding to a transmission rate of the optical signal, as described below. This reduces the inter-symbol interference of the data signal due to the band limitation of the transmission line 9.

The pulse shaping unit 105 performs pulse shaping of the electric field signals Xi, Xq, Yi and Yq input from the precoding unit 104 and outputs them to the DACs 12a to 12d.

The reception processing circuit 20 includes a timing regeneration unit 200, a distortion compensation unit 201, a decoding unit 202, a symbol extraction unit 203, an FEC decoding unit 204, and a frame processing unit 205. The timing regeneration unit 200 regenerates the timing of the electric field signals Xi, Xq, Yi and Yq input from the ADCs 22a to 22d and outputs them to the distortion compensation unit 201.

The distortion compensation unit 201 compensates for various distortions generated in the transmission device 1, the transmission line 9 and the like with respect to the electric field signals Xi, Xq, Yi and Yq. The distortion compensation unit 201 includes a dispersion compensation unit 201a, a non-linear compensation unit 201b, the adaptive equalization unit 201c, the phase noise compensation unit 201d, and an imbalance compensation unit 201e.

The dispersion compensation unit 201a compensates for the dispersion generated in the optical signal in the transmission line 9 by operation processing such as Fourier transform. The non-linear compensation unit 201b is provided at a subsequent stage of the dispersion compensation unit 201a, and compensates for nonlinear distortion such as self-phase modulation generated in the optical signal in the transmission line 9 by using a filter or the like.

The adaptive equalization unit 201c is provided at the subsequent stage of the non-linear compensation unit 201b, and compensates for the polarization fluctuation generated in the optical signal in the transmission line 9 by performing polarization separation processing using a filter or the like based on the pilot symbols inserted in the electric field signals Xi, Xq, Yi and Yq. The phase noise compensation unit 201d is provided at the subsequent stage of the adaptive equalization unit 201c, and compensates for a phase noise generated in the optical signal in the transmission line 9 by performing phase estimation based on the pilot symbols inserted in the electric field signals Xi, Xq, Yi, and Yq.

The imbalance compensation unit 201e is provided at the subsequent stage of the phase noise compensation unit 201d, and compensates for the imbalance between the electric field signals Xi and Yi of the I-component and the electric field signals Xq and Yq of the Q-component in the transmitting device 1 by, for example, adjusting the skews and the amplitudes of the electric field signals Xi, Xq, Yi and Yq. The electric field signals Xi, Xq, Yi and Yq are output from the imbalance compensation unit 201e to the decoding unit 202.

The decoding unit 202 divides each of the electric field signals Xi, Xq, Yi and Yq precoded by the precoding unit 104 into the above data blocks and decodes the data blocks. The decoding unit 202 restores the data signal from the decoded data blocks and outputs it to the symbol extraction unit 203. The decoding unit is not necessary since the data can be recovered without it.

The symbol extraction unit 203 extracts the training symbol and the pilot symbol from the data signal, and outputs a remaining data signal to the FEC decoding unit 204. The FEC decoding unit 304 decodes the error correction codes of the electric field signals Xi, Xq, Yi, and Yq to demodulate the data signal. The demodulated data signal is input to the frame processing unit 205. The frame processing unit 205 accommodates the data signal into the Ethernet frame and outputs it to a functional block of the subsequent stage.

Figure 3:
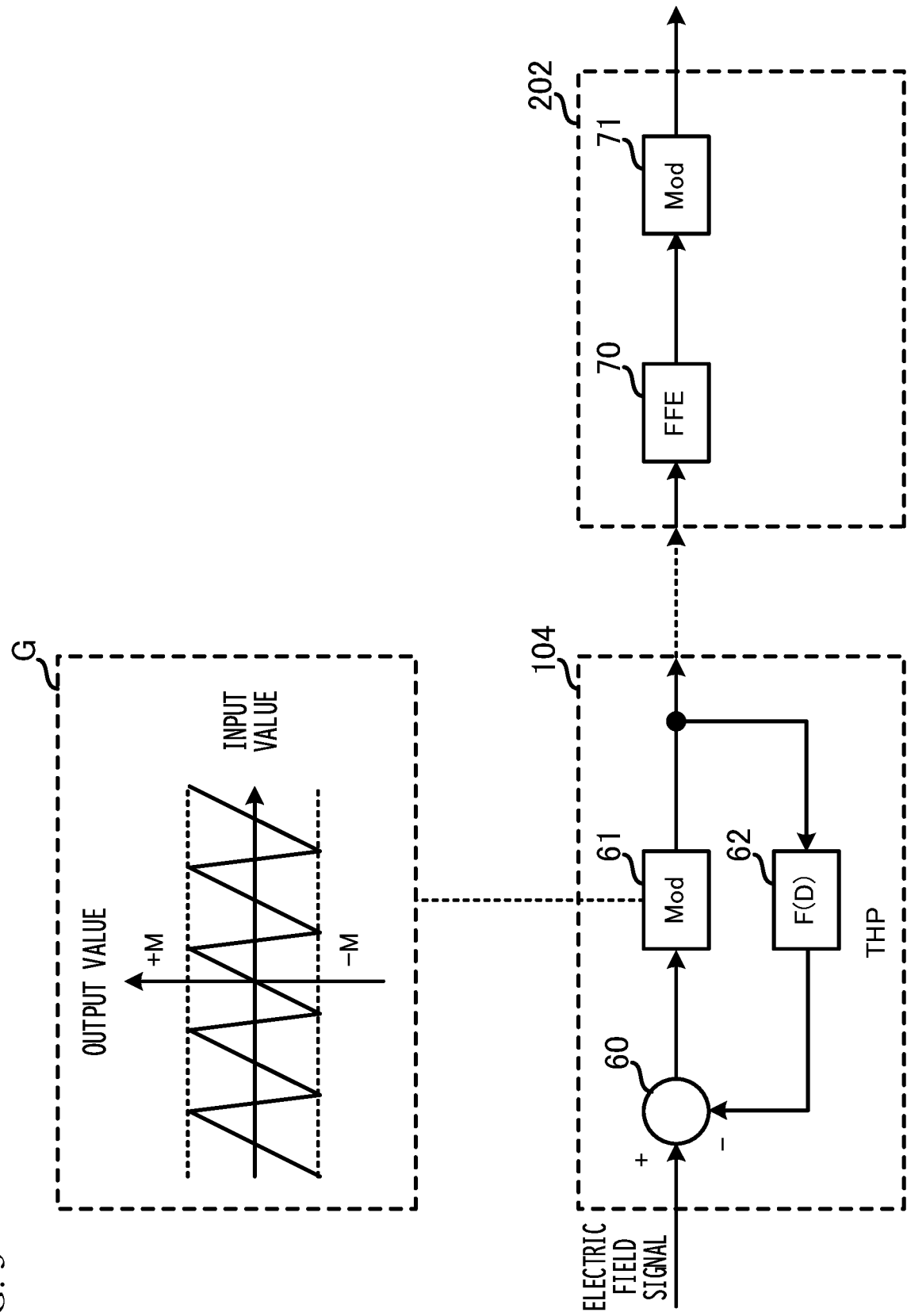
FIG. 3 is a diagram schematically illustrating a precoding unit and a decoding unit.

FIG. 3 is a diagram schematically illustrating the precoding unit 104 and the decoding unit 202. The precoding unit 104 includes an addition unit 60, a modulo operation unit 61, and a precoder 62.

The precoding unit (THP) 104 is configured as the THP operation unit.

The precoder 62 generates signal components F(D) (hereinafter referred to as "interference components") of the inter-symbol interference of the electric field signals Xi, Xq, Yi and Yq due to the band control of the transmission line 9, from the electric field signals Xi, Xq, Yi and Yq and outputs them to the addition unit 60. After the precoder 62 corrects the electric field signals Xi, Xq, Yi and Yq by the interference components, the modulo operation unit 61 performs modulo operation on the electric field signals Xi, Xq, Yi and Yq, and the electric field signals Xi, Xq, Yi and Yq are output from the precoding unit 104. More specifically, the precoder 62 generates the interference components F(D) from forward other symbols on the time axis with respect to the respective symbols included in the electric field signals Xi, Xq, Yi and Yq.

The electric field signals Xi, Xq, Yi and Yq input to the modulo operation unit 61 are a result in which the addition unit 60 adds the interference components F(D) input from the precoder 62 to original electric field signals Xi, Xq, Yi and Yq. In this way, the interference components F(D) generated in the transmission line 9 are subtracted from the electric field signals Xi, Xq, Yi and Yq in advance before the transmission of the optical signal.

At this time, the addition of the interference components F(D) to the electric field signals Xi, Xq, Yi and Yq may cause peak values of the amplitudes of the electric field signals Xi, Xq, Yi and Yq to increase and diverge. Therefore, the modulo operation unit 61 performs the modulo operation on the electric field signals Xi, Xq, Yi and Yq to shift and output the input values of the electric field signals Xi, Xq, Yi and Yq so that the input values fall within a range (±M) of the amplitudes of the original electric field signals Xi, Xq, Yi and Yq, as indicated by a sign G.

The decoding unit 202 includes a feed forward equalizer (FFE) 70 and a modulo operation unit 71. The FFE 70 compensates for the interference components from other symbols behind on the time axis with respect to the respective symbols included in the electric field signals Xi, Xq, Yi and Yq. The electric field signals Xi, Xq, Yi and Yq are output from the FFE 70 to the modulo operation unit 71.

The modulo operation unit 71 converts the signal values of the electric field signals Xi, Xq, Yi and Yq in the opposite way to the modulo operation unit 61 in the precoding unit 104. This returns the amplitudes of the electric field signals Xi, Xq, Yi and Yq to the amplitudes before the electric field signals Xi, Xq, Yi and Yq are input to the modulo operation unit 61.

(Precoding Unit)

Figure 4:
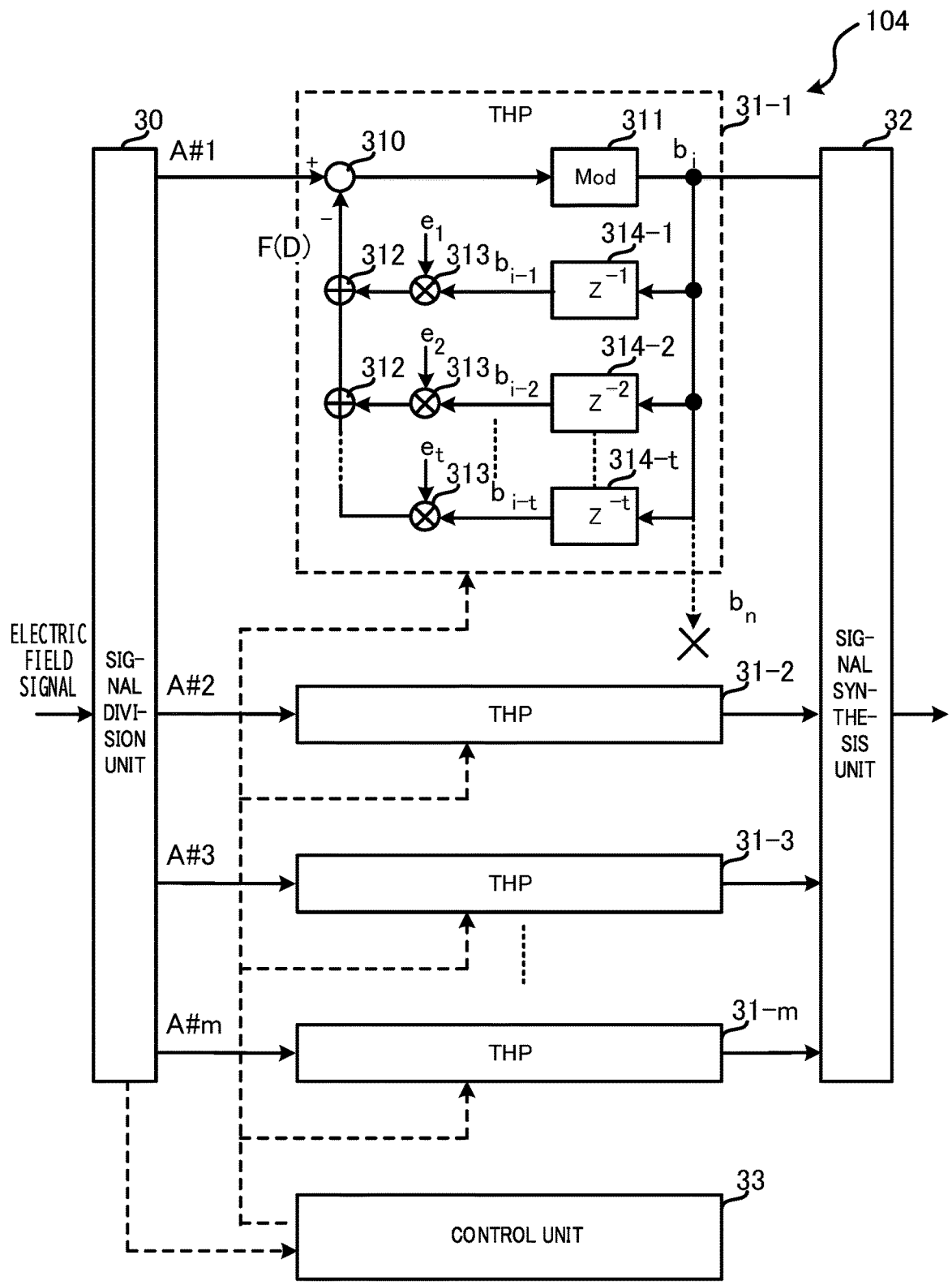
FIG. 4 is a block diagram illustrating an example of the precoding unit.

FIG. 4 is a block diagram illustrating an example of the precoding unit 104. The precoding unit 104 includes a signal division unit 30, THP operation units (THP) 31-1 to 31-*m* (m: an integer of 2 or more), a signal synthesis unit 32, and a control unit 33. The signal division unit 30, the THP operation units 31-1 to 31-*m*, the signal synthesis unit 32 and the control unit 33 are provided for each of the electric field signals Xi, Xq, Yi and Yq, but only the configuration corresponding to one of the electric field signals Xi, Xq, Yi and Yq is illustrated in FIG. 4.

The signal division unit 30 divides each of the electric field signals Xi, Xq, Yi and Yq into a plurality of data blocks A #1 to A #m.

Figure 5:
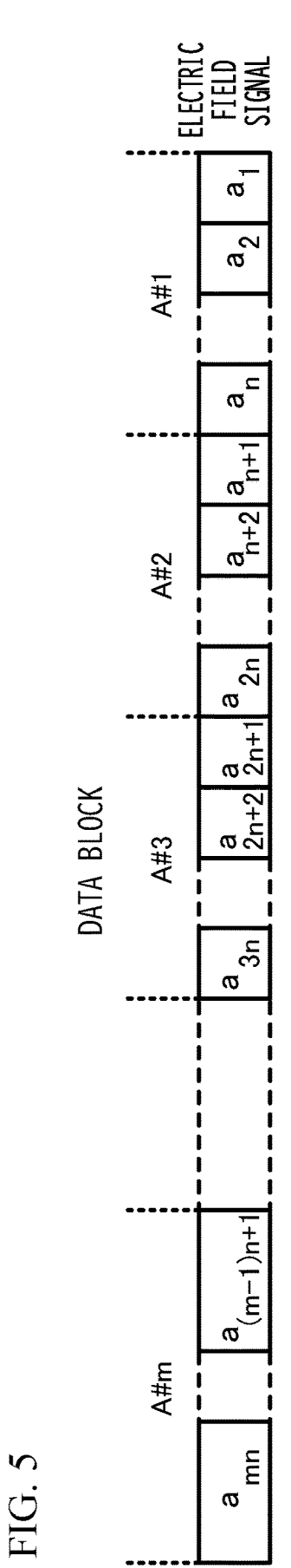
FIG. 5 is a diagram illustrating an example of division of data blocks.

FIG. 5 is a diagram illustrating an example of division of the data blocks A #1 to A #m. The signal division unit 30, for example, counts the number of symbols includes in each of the electric field signals Xi, Xq, Yi, Yq with a counter, and divides each of the electric field signals Xi, Xq, Yi, Yq into the data blocks A #1 to A #m for each predetermined number n of symbols (n: an integer of 2 or more) according to the time series sequence. For example, the data block A #1 includes symbols $a_1$ to $a_n$, and the data block A #2 includes symbols $a_{n+1}$ to $a_{2n}$. The number of symbols in each of the data blocks A #1 to A #m is determined based on a processing speed of the precoding unit 104 and the like.

Referring to FIG. 4 again, the signal division unit 30 outputs the data blocks A #1 to A #m divided from each of the electric field signals Xi, Xq, Yi and Yq to the THP operation units 31-1 to 31-*m*, respectively. The THP operation units 31-1 to 31-*m* compensate for the inter-symbol interference of each of the electric field signals Xi, Xq, Yi and Yq, as described with reference to FIG. 3. Although the configuration of the THP operation units 31-2 to 31-*m* is omitted, each of the THP operation units 31-2 to 31-*m* has the same configuration as the THP operation unit 31-1.

The THP operation units 31-1 to 31-*m* precode the data blocks A #1 to A #m in parallel, respectively. Each of the THP operation units 31-1 to 31-*m* includes an addition unit 310, a modulo operation unit 311, t (t: positive integer) delay generators ($Z^{-1}$ to $Z^{-t}$) 314-1 to 314-*t*, t multipliers 313, and (t−1) adders 312. The addition unit 310 and the modulo operation unit 311 have the same functions as the addition unit 60 and the modulo operation unit 61 described above, respectively. The delay generators 314-1 to 314-*t*, the multipliers 313 and the adders 312 have the same functions as the precoder 62 described above.

The symbols $a_i$ (i: positive integer) in the data blocks A #1 to A #m are output to the modulo operation unit 311 after the interference component F(D) is added by the addition unit 310. The result of the modulo operation in the modulo operation unit 311 is output as $b_i$. The symbol $b_i$ is output from the modulo operation unit 311 to the signal synthesis unit 32 and each of the delay generators ($Z^{-1}$ to $Z^{-t}$) 314-1 to 314-*t*.

The delay generators 314-1 to 314-*t* delay the symbol $b_i$ and output it to the multipliers 313. For example, the delay generator 314-1 delays the symbol $b_i$ by the time of one symbol, the delay generator 314-2 delays the symbol $b_i$ by the time of two symbols, and the delay generator 314-T delays the symbol $b_i$ by the time of t symbols. Therefore, the delay generators 314-1 to 314-*t* output the symbols $b_{i-1}$, $b_{i-2}$ to $b_{i-t}$ before the symbol $b_i$ in the time series to the multipliers 313, respectively.

The multipliers 313 connected to the delay generators 314-1 to 314-*t* multiply tap coefficients $e_1$ to $e_t$ to the symbols $b_{i-1}$ to $b_{i-t}$, respectively, and outputs the results of the multiplication to the adders 312. The tap coefficients $e_i$ to $e_t$ are set by the control unit 33 according to the characteristics of the inter-symbol interference that occurs in the transmission line 9, for example.

The adders 312 are connected to the subsequent stage of the delay generators 314-1 to 314-(*t*−1), and generate the interference component F(D) by adding the symbols $b_{i-1}$ to $b_{i-t}$ multiplied by the tap coefficients $e_i$ to $e_t$. The addition unit 310 adds the interference component F(D) to the symbol $a_i$. Thereby, the modulo operation of the interference component F(D) added to the symbol $a_i$ is executed by the modulo operation unit 311 and the symbol $b_i$ is output. Therefore, the interference from the forward symbols $a_{i-1}$ to $a_{i-t}$ on the time series of the data blocks A #1 to A #m to the backward symbol $a_i$ is compensated.

The THP operation units 31-1 to 31-*m* output the symbols $b_i$ in the data blocks A #1 to A #m to the signal synthesis unit 32, respectively. The signal synthesis unit 32 sequentially outputs the symbols $b_i$ in the data blocks A #1 to A #m according to the time series. Thereby, the signal synthesis unit 32 outputs the data blocks A #1 to A #m in an order (see FIG. 5) before the data blocks A #1 to A #m are input to the signal division unit 30.

The control unit 33 controls the precoding of each of the THP operation units 31-1 to 31-*m*. The control unit 33 sets, for example, the tap coefficients $e_1$ to $e_t$, receives notification indicative of the output timing of the data blocks A #1 to A #m from the signal division unit 30, and sets the initial values to be input to the multipliers 313 to the THP operation units 31-1 to 31-*m*, respectively.

Since the THP operation units 31-1 to 31-*m* execute precoding processes in parallel and independently of each other, the ends of the data blocks A #1 to A #m to be precoded by other THP operation units 31-1 to 31-*m* cannot be fed back to the beginnings of the data blocks A #1 to A #m to be precoded by oneself.

For example, the THP operation unit 31-2 cannot receive the symbol bn at the end of the data block A #1 immediately before the data block A #2 to be precoded, from the THP operation unit 31-1 (see "x" mark). For example, if the THP operation unit 31-2 starts the precoding of the subsequent data block A #2 after receiving the last symbol $b_n$ of the data block A #1 from the THP operation unit 31-1, the THP operation units 31-1 and 31-2 cannot precode the data blocks A #1 and A #2 in parallel, respectively, because the start timings of the precoding are shifted.

For this reason, if the data blocks A #1 to A #m are transmitted to the transmission line in succession according to the order in the original electric field signals Xi, Xq, Yi, Yq, it is difficult to compensate for inter-symbol interference from symbols near the end of the immediately preceding data block A #1 with respect to symbols near the beginning of the data block A #2, for example. The inter-symbol interference in this case will be described below.

(Comparative Example of Inter-Symbol Interference)

Figure 6:
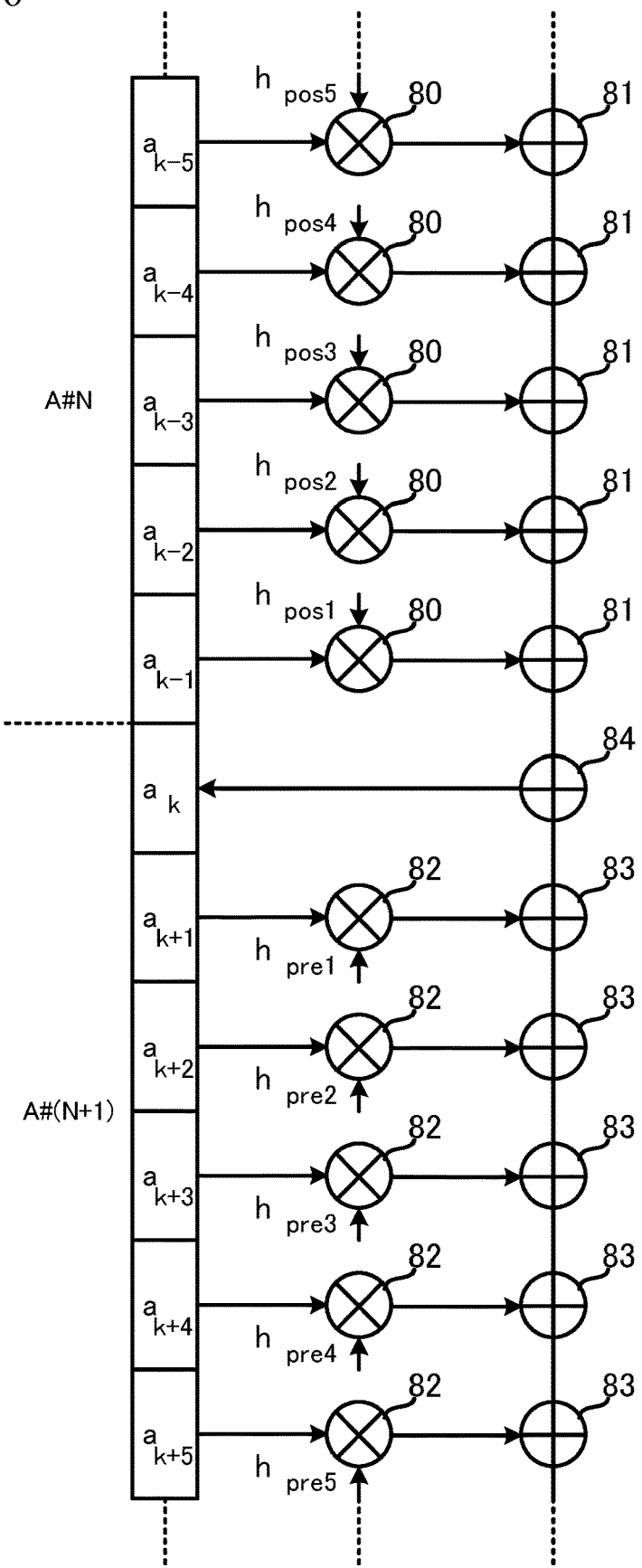
FIG. 6 is a diagram illustrating a comparative example of inter-symbol interference of symbols.

FIG. 6 is a diagram illustrating a comparative example of the inter-symbol interference of the symbols. More specifically, FIG. 6 illustrates the inter-symbol interference that occurs in the data blocks A #N and A #(N+1) (N: positive integer) included in the optical signal transmitted through the transmission line 9.

The transmission device 1 transmits the data block A #(N+1) so as to be consecutive to the end of the data block A #N. Symbols $a_{k-5}$ to $a_{k-1}$ are included in an end portion of the data block A #N, and symbols $a_k$ to $a_{k+5}$ are included in a beginning portion of the data block A #(N+1).

Multipliers 80 and adders 81 indicate the action of the inter-symbol interference (hereafter referred to as "forward interference") from the symbols $a_{k-5}$ to $a_{k-1}$ at the end of the data block A #N to the head symbol $a_k$ of the data block A #(N+1). Further, multipliers 82 and adders 83 indicate the action of the inter-symbol interference (hereafter referred to as "backward interference") from subsequent symbols $a_{k+1}$ to $a_{k+5}$ in the time series to the head symbol $a_k$ of the data block A #(N+1). In this example, the action of the inter-symbol interference from symbols other than those mentioned above to the symbol $a_k$ is ignored.

In a numerical calculation model of the inter-symbol interference, the strength of the forward interference can be expressed as, for example, the sum of the multiplication values of the symbols $a_{k-5}$ to $a_{k-1}$ and the coefficients $h_{pos5}$ to $h_{pos1}$ relating to the band characteristics. Further, the strength of the backward interference can be expressed as, for example, the sum of the multiplication values of the symbols $a_{k+1}$ to $a_{k+5}$ and the coefficients $h_{pre1}$ to $h_{pre5}$ relating to the band characteristics. The adder 84 indicates that the forward interference and the backward interference are added and act on the symbol $a_k$.

(Equation 1)

$$r_k = h_0 a_k + \sum_{i=-\infty}^{-1} h_{pre(i)} a_{k-i} + \sum_{i=1}^{\infty} h_{pos(i)} a_{k-i} \quad (1)$$

According to the numerical calculation model, a signal component $r_k$ after the inter-symbol interference of the symbol $a_k$ is calculated according to, for example, the above equation (1). Here, ho is a coefficient related to the band characteristics of the symbol $a_k$. A first term of the equation (1) is a signal component of the symbol $a_k$, a second term is a signal component of the backward interference, and a third term is a signal component of the forward interference.

Figure 7:
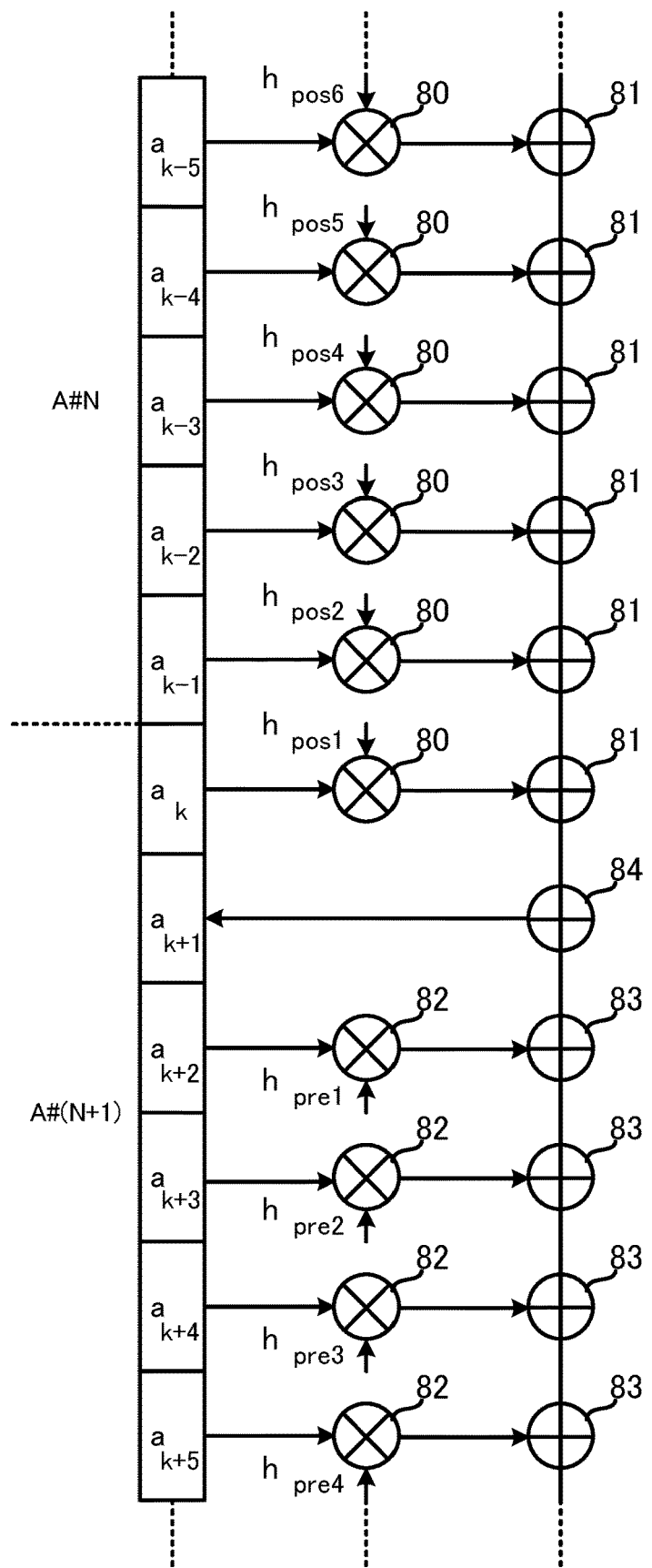
FIG. 7 is a diagram illustrating a comparative example of inter-symbol interference of other symbols.

FIG. 7 is a diagram illustrating a comparative example of the inter-symbol interference of other symbols. In FIG. 7, the configurations common to those in FIG. 6 are designated by the same reference numerals, and the description thereof will be omitted. As can be understood from FIG. 7, the forward interference also acts on the symbol $a_{k+1}$ behind the symbol $a_k$ from the forward symbols $a_{k-5}$ to $a_k$, and the backward interference also acts the symbol $a_{k+1}$ from the backward symbols $a_{k+2}$ to $a_{k+5}$.

As described above, the forward interference is compensated by the THP operation units 31-1 to 31-m, and the backward interference of the transmitting device 1 is compensated by the FFE 70 of the receiving device 2. However, with respect to the forward interference, since the THP operation units 31-1 to 31-m execute the precoding process in parallel and independently of each other, the symbols $a_{k-5}$ to $a_{k-1}$ in the end portion of the data block A #N cannot be fed back to the symbols $a_k$ and $a_{k+1}$ in the beginning portion of the data block A #(N+1), for example. Therefore, it is difficult to compensate for the inter-symbol interference from the symbols $a_{k-5}$ to $a_{k-1}$ in the end portion of the immediately preceding data block A #N with respect to the symbols $a_k$ and $a_{k+1}$ in the beginning portion of the data block A #(N+1).

(Imparting Redundant Symbols)

Therefore, the symbol insertion unit 103 adds redundant symbols to the beginning of each of the data blocks A #1 to A #m in addition to the pilot symbols and the training symbols. Thereby, each of the THP operation units 31-1 to 31-m can feed back the redundant symbols to the symbol at the beginning portion of each of the data blocks A #1 to A #m.

Figure 8:
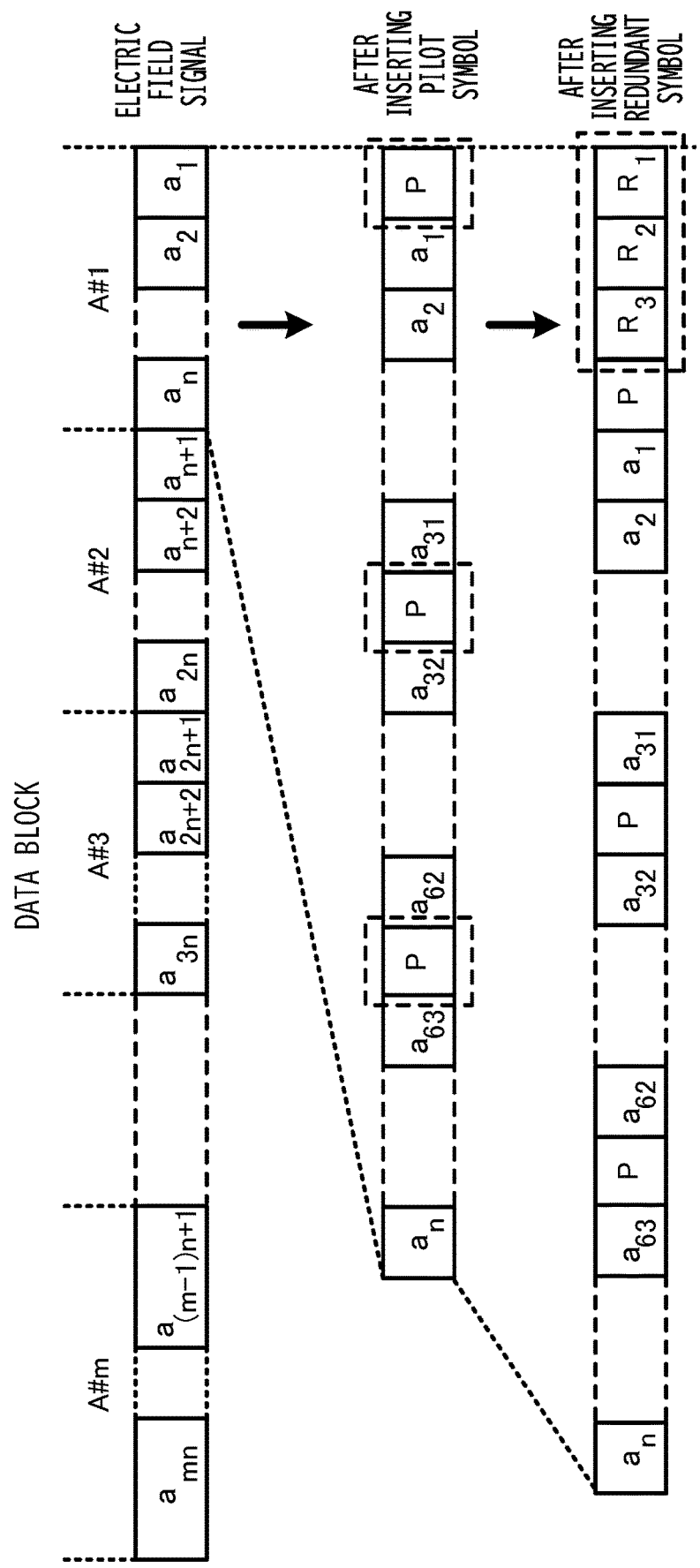
FIG. 8 is a diagram illustrating an example of the operation of a symbol insertion unit.

FIG. 8 is a diagram illustrating an example of the operation of the symbol insertion unit 103. In FIG. 8, the configurations common to those in FIG. 5 are designated by the same reference numerals, and the description thereof will be omitted. In this example, the illustration of the insertion of the training symbols is omitted.

The symbol insertion unit 103 inserts pilot symbols P into the electric field signals Xi, Xq, Yi and Yq at a rate of one per 32 symbols, for example. In FIG. 8, the pilot symbol P is inserted at the beginning of the data blocks A #1, but the pilot symbol P is not necessarily inserted at the beginning of each of the data blocks A #1 to A #m.

Further, the symbol insertion unit 103 inserts three redundant symbols $R_1$ to $R_3$ at the beginning of each of the data blocks A #1 to A #m, as an example. Although only the data block A #1 is illustrated in FIG. 8, the symbol insertion unit 103 also inserts the redundant symbols $R_1$ to $R_3$ at the beginning of each of the other data blocks A #2 to A #m. The redundant symbols are an example of redundant data.

An insertion order of the pilot symbols P and the redundant symbols $R_1$ to $R_3$ is not limited. There is no limitation on the number of redundant symbols $R_1$ to $R_3$. For example, the number of redundant symbols $R_1$ to $R_3$ can be determined according to the coefficients $h_{pos5}$ to $h_{pos1}$ relating to the band characteristics in the above numerical calculation model and the interference resistance of the redundant symbols $R_1$ to $R_3$.

Each of the THP operation units 31-1 to 31-m feeds back the redundant symbols $R_1$ to $R_3$ to the symbol at the beginning of each of the data blocks A #1 to A #m. Therefore, the inter-symbol interference from the immediately precoding data blocks A #1 to A #m with respect to the symbol at the beginning of each of the data blocks A #1 to A #m is reduced.

Figure 9:
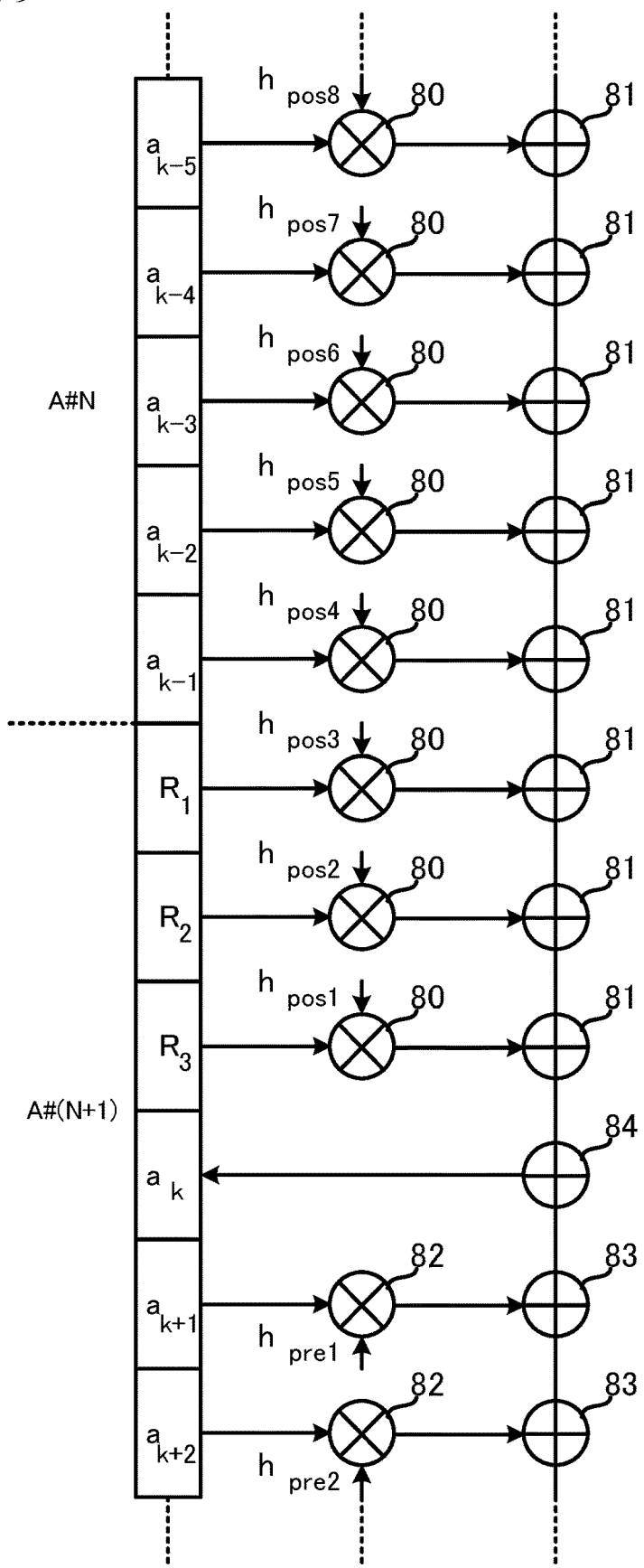
FIG. 9 is a diagram illustrating the inter-symbol interference of the redundant symbols with respect to a head symbol of the data block.

FIG. 9 is a diagram illustrating the inter-symbol interference of the redundant symbols $R_1$ to $R_3$ with respect to the head symbol $a_k$ of the data block A #(N+1). In FIG. 9, the configurations common to those in FIG. 6 are designated by the same reference numerals, and the description thereof will be omitted.

The forward interference acts on the head symbol $a_k$ from the redundant symbols $R_1$ to $R_3$ and the forward symbols $a_{k-5}$ to $a_{k-1}$. Here, the coefficients $h_{pos1}$ to $h_{pos3}$ correspond to the redundant symbols $R_1$ to $R_3$, and the coefficients $h_{pos4}$ to $h_{pos8}$ correspond to the symbols $a_{k-1}$ to $a_{k-5}$.

The redundant symbols $R_1$ to $R_3$ have a stronger interference action than the symbols $a_{k-5}$ to $a_{k-1}$ because a transmission order of the redundant symbols $R_1$ to $R_3$ is closer to the head symbol $a_k$ than the symbols $a_{k-5}$ to $a_{k-1}$. However, the THP operation unit 31-(N+1) feeds back the redundant symbols $R_1$ to $R_3$ to the head symbol $a_k$ of the data block A #(N+1), so that the inter-symbol interference is reduced.

On the other hand, the symbols $a_{k-5}$ to $a_{k-1}$ in the end portion of the data block A #N are farther away from the head symbol $a_k$ in the transmission order than the redundant symbols $R_1$ to $R_3$, and hence the inter-symbol interference of the symbols $a_{k-5}$ to $a_{k-1}$ is smaller than that of the redundant symbols $R_1$ to $R_3$. Compared with the example of FIG. 6, since the redundant symbols $R_1$ to $R_3$ are imparted to the beginning of the data block A #(N+1), distances between the head symbol $a_k$ of the data block A #(N+1) and the symbols $a_{k-5}$ to $a_{k-1}$ in the end portions of the data block A #N are extended to reduce the inter-symbol interference.

For this reason, even if the THP operation unit 31-(N+1) does not feed back the symbols $a_{k-5}$ to $a_{k-1}$ in the end portion of the data block A #N to the head symbol $a_k$ of the data block A #(N+1), an effect of the inter-symbol interference is reduced compared to the example in FIG. 6. The redundant symbols $R_1$ to $R_3$ are also affected by the inter-symbol interference.

Figure 10:
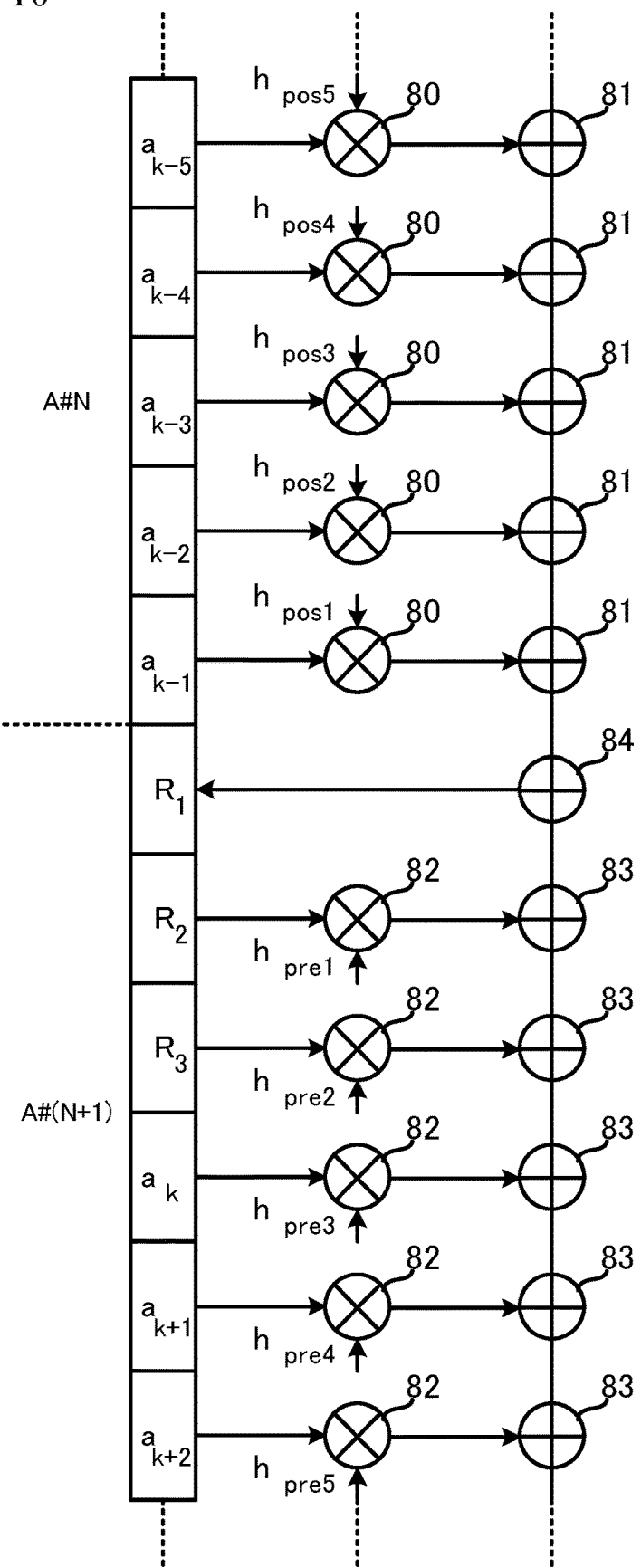
FIG. 10 is a diagram illustrating the inter-symbol interference of other symbols with respect to the redundant symbols.

FIG. 10 is a diagram illustrating the inter-symbol interference of other symbols $a_{k-5}$ to $a_{k+2}$ with respect to the redundant symbols $R_1$ to $R_3$. In FIG. 10, the configurations common to those in FIG. 9 are designated by the same reference numerals, and the description thereof will be omitted.

For example, the forward interference acts on the redundant symbol $R_1$ from the forward symbols $a_{k-5}$ to $a_{k-1}$, and the backward interference acts on the redundant symbol $R_1$ from the backward redundant symbols $R_2$ and $R_3$ and the symbols $a_{k-5}$ to $a_{k-1}$. Regarding the forward interference, as compared with the example in FIG. 6, the redundant symbol $R_1$ is strongly affected by the symbols $a_{k-5}$ to $a_{k-1}$ instead of the head symbol $a_k$, so that the effect of the symbols $a_{k-5}$ to $a_{k-1}$ on the head symbol $a_k$ is reduced.

In this way, the symbol insertion unit 103 imparts the redundant symbols $R_1$ to $R_3$ to the beginning of each of the plurality of data blocks A #1 to A #m divided from each of the electric field signals Xi, Xq, Yi, and Yq. The THP operation units 31-1 to 31-$m$ precode the data blocks A #1 to A #m in parallel to which the redundant symbols $R_1$ to $R_3$ are imparted, respectively. The symbol insertion unit 103 is an example of an imparter.

The signal synthesis unit 32 sequentially outputs the data blocks A #1 to A #m precoded by the THP operation unit 31-1 to 31-$m$, respectively, and the redundancy symbols $R_1$ to $R_3$ imparted to each of the data blocks A #1 to A #m to the optical transmission unit 19 according to an arrangement order in the electric field signals Xi, Xq, Yi and Yq. The plurality of data blocks A #1 to A #m to which the redundancy symbols $R_1$ to $R_3$ are imparted are transmitted from the optical transmission unit 19 to the transmission line 9. The signal synthesis unit 32 is an example of the transmitter.

The THP operation units 31-1 to 31-$m$ feed back the redundant symbols $R_1$ to $R_3$ to the data blocks A #1 to A #m, respectively. This reduces the inter-symbol interference from the redundant symbols $R_1$ to $R_3$ to the head symbol $a_k$ of each data block A #(N+1).

In the data blocks A #1 to A #m adjacent to each other in the transmission order to the transmission line 9, the head symbol $a_k$ of the backward data block A #(N+1) and the symbols $a_{k-5}$ to $a_{k-1}$ in the end portion of the forward data block A #N are separated from each other by imparting the redundant symbols $R_1$ to $R_3$. Thereby, the inter-symbol interference of the symbols $a_{k-5}$ to $a_{k-1}$ in the end portion of the forward data block A #N with respect to the head symbol $a_k$ of the backward data block A #(N+1) is reduced.

Therefore, the transmitting device 1 can reduce the inter-symbol interference of the electric field signals Xi, Xq, Yi and Yq in which the data blocks A #1 to A #m are precoded in parallel.

(Variation of Redundant Symbol)

The data of the redundant symbol is not limited, for example, it may be fixed pattern data. The redundant symbol may include information about compensation of transmission quality as the pilot symbol P.

Figure 11:
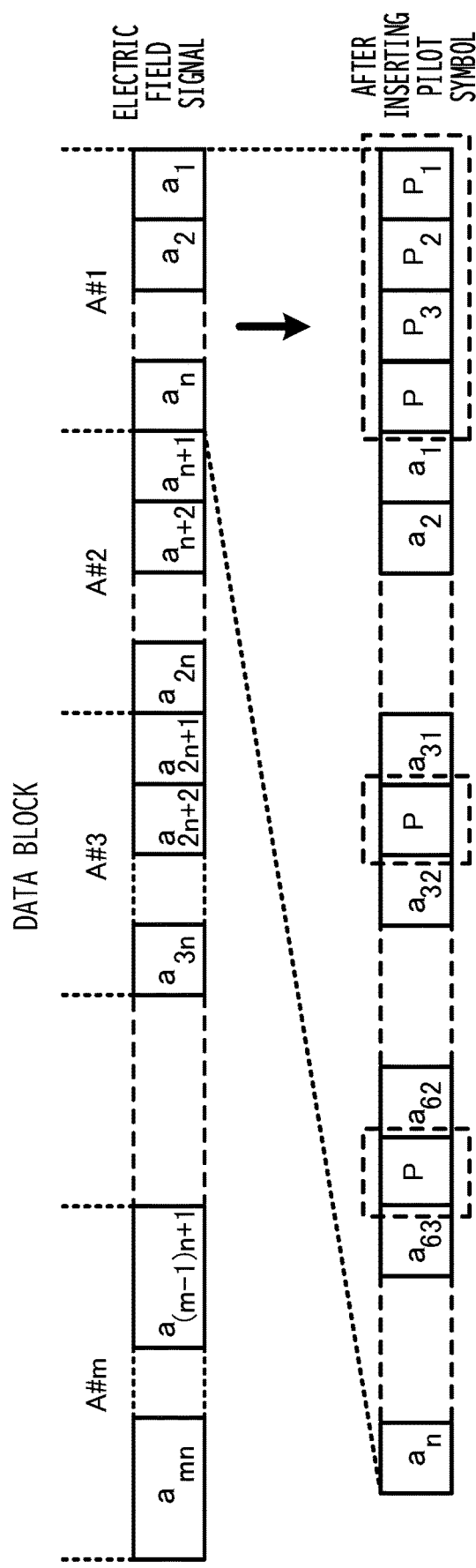
FIG. 11 is a diagram illustrating another example of the operation of the symbol insertion unit.

FIG. 11 is a diagram illustrating another example of the operation of the symbol insertion unit 103. In FIG. 11, the configurations common to those in FIG. 8 are designated by the same reference numerals, and the description thereof will be omitted. In this example, the illustration of the insertion of the training symbols is omitted.

As an example, the number of redundant pilot symbols is 3. The symbol insertion unit 103 imparts redundant pilot symbols $P_1$ to $P_3$ that function as the redundant symbols to the beginning of each of the data blocks A #1 to A #m in addition to the pilot symbol P described above. The number of redundant pilot symbols is not limited to 3. The redundant pilot symbols $P_1$ to $P_3$ include information to be used in the adaptive equalization unit 201$c$ and the phase noise compensation unit 201$d$ in the receiving device 2, as in the normal pilot symbol P. This information is an example of compensation information regarding the compensation of the quality of the optical signal (the electric field signals Xi, Xq, Yi and Yq) transmitted through the transmission line 9.

In this way, when the symbol insertion unit 103 imparts the redundant pilot symbols $P_1$ to $P_3$ to the beginning of each of the data blocks A #1 to A #m, it is desirable to improve the resistance of the inter-symbol interference of the redundant pilot symbols $P_1$ to $P_3$. For this reason, the THP operation units 31-1 to 31-$m$ may precode the redundant pilot symbols $P_1$ to $P_3$ in the same way as other symbols.

Figure 12:
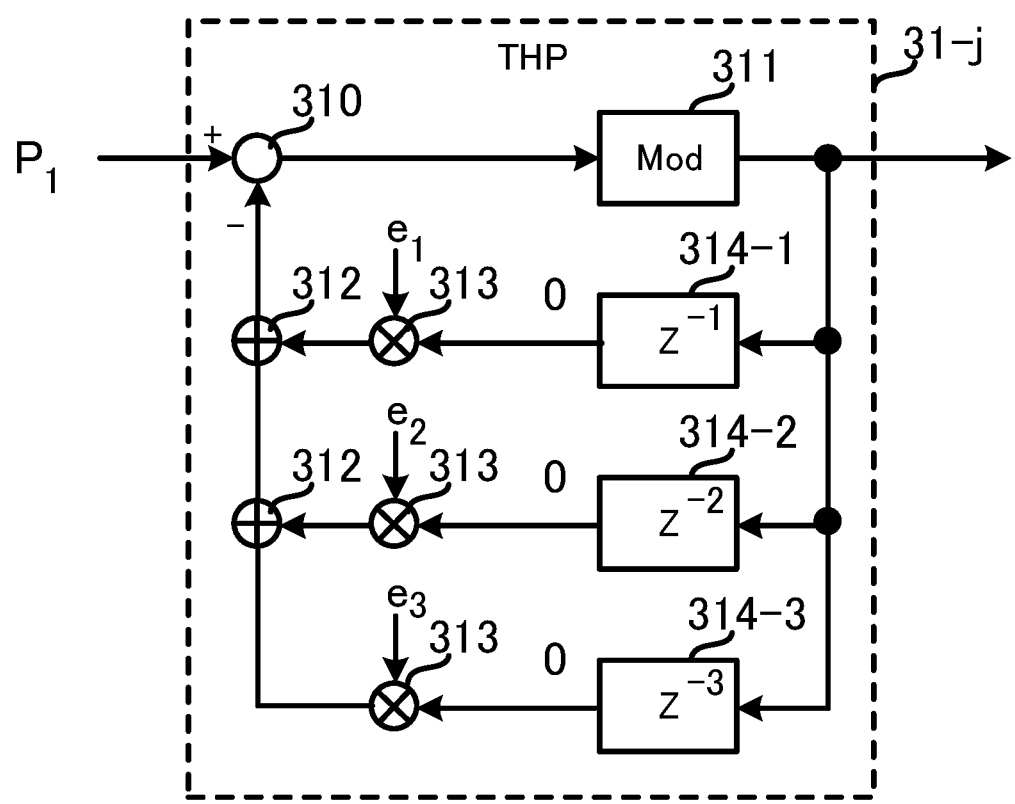
FIG. 12 is a diagram illustrating an example of precoding of redundant pilot symbols (part 1)
Figure 13:
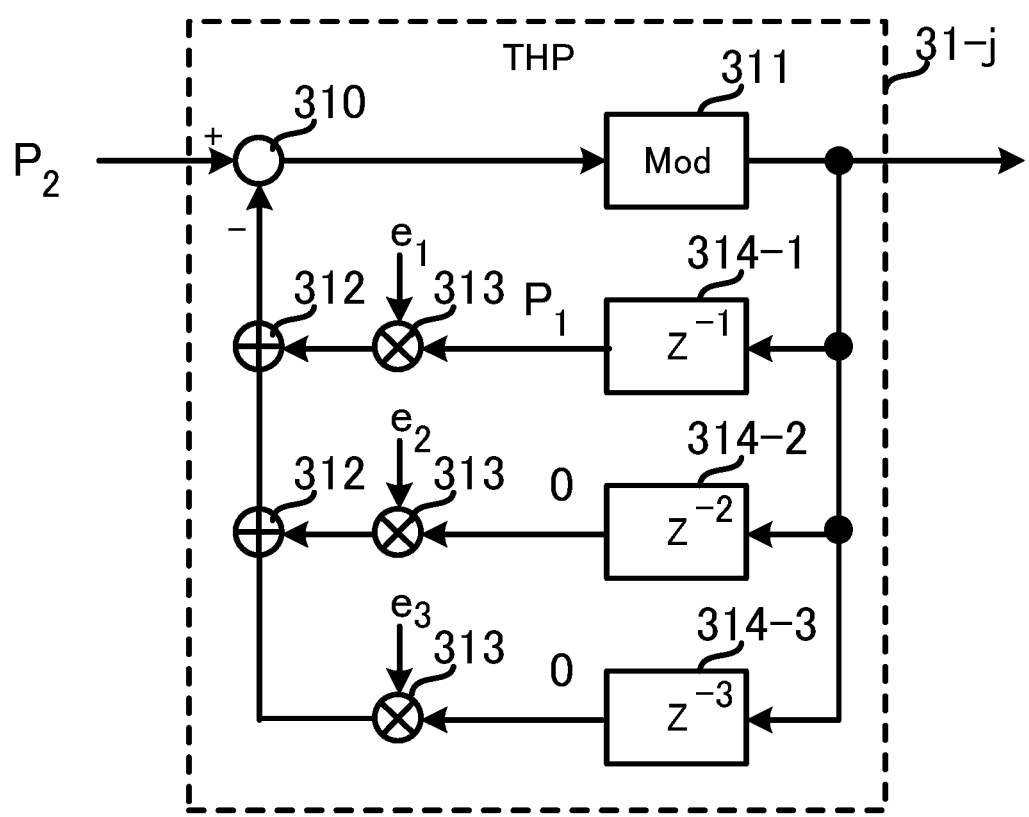
FIG. 13 is a diagram illustrating an example of precoding of redundant pilot symbols (part 2)
Figure 14:
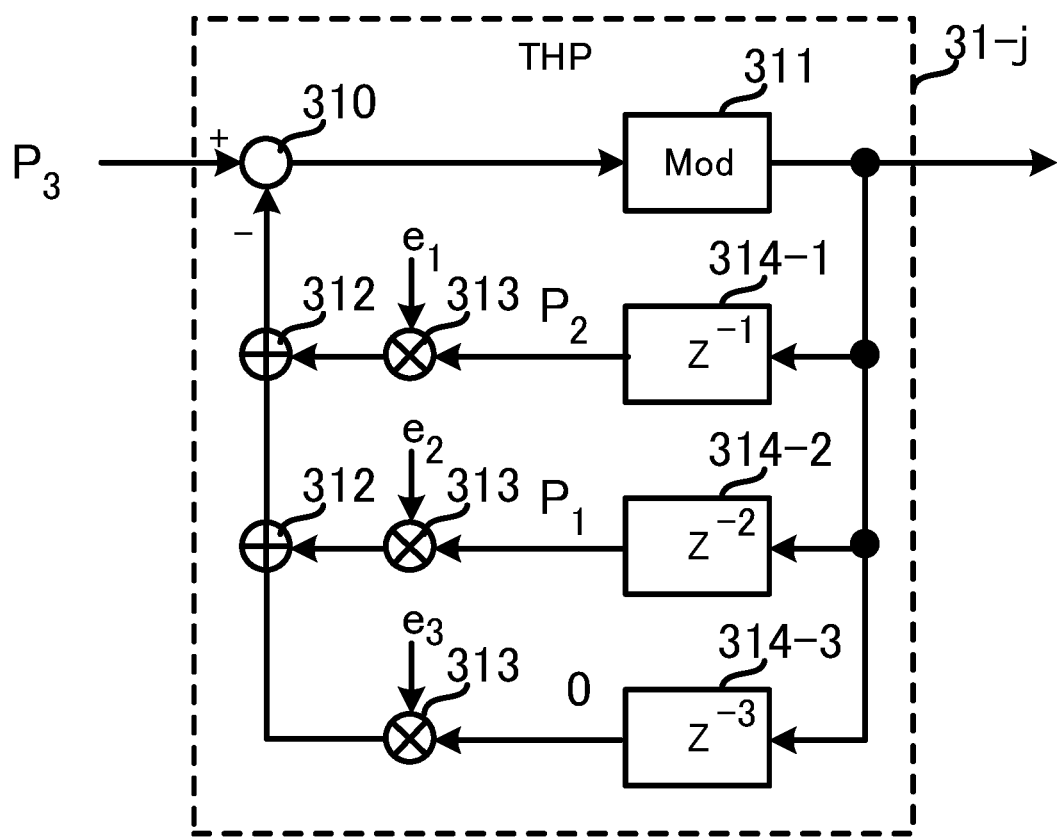
FIG. 14 is a diagram illustrating an example of precoding of redundant pilot symbols (part 3)

FIGS. 12 to 14 are diagrams illustrating an example of the precoding of redundant pilot symbols $P_1$ to $P_3$. More specifically, FIGS. 12 to 14 illustrate the precoding of the redundant pilot symbols $P_1$ to $P_3$ of the THP operation unit 31-$j$ (j=1 to m) in symbol units, in time series. The THP operation unit 31-$j$ includes three delay generators 314-1 to 314-3, multipliers 313, and two adders 312, as an example.

FIG. 12 illustrates a state when the redundant pilot symbol $P_1$ is input to the THP operation unit 31-$j$. Since the redundant pilot symbol $P_1$ is located at the beginning of the data block A #j, there is no symbol to feed back. Therefore, the control unit 33 sets "0" as an input value to each multiplier 313. Thereby, "0" is fed back to the redundant pilot symbol $P_1$.

FIG. 13 illustrates a state when the redundant pilot symbol $P_2$ is input to the THP operation unit 31-$j$. At this time, the immediately preceding redundant pilot symbol $P_1$ is input from the delay generator 314-1 to the multiplier 313. Thereby, the redundant pilot symbol $P_1$ and "0" are fed back to the redundant pilot symbol $P_2$.

FIG. 14 illustrates a state when the redundant pilot symbol $P_3$ is input to the THP operation unit 31-$j$. At this time, the immediately preceding redundant pilot symbol $P_2$ is input from the delay generator 314-1 to the multiplier 313, and the head of the precoded redundant pilot symbol $P_1$ is input from the delay generator 314-2 to the multiplier 313. Thereby, the precoded redundant pilot symbols $P_1$ and $P_2$, and "0" are fed back to the redundant pilot symbol $P_3$.

Therefore, among the redundant pilot symbols $P_1$ to $P_3$, the resistance to the inter-symbol interference of the most backward redundant pilot symbol $P_3$ is the strongest, and then the resistance to the inter-symbol interference of the redundant pilot symbol $P_2$ is strong.

Figure 15:
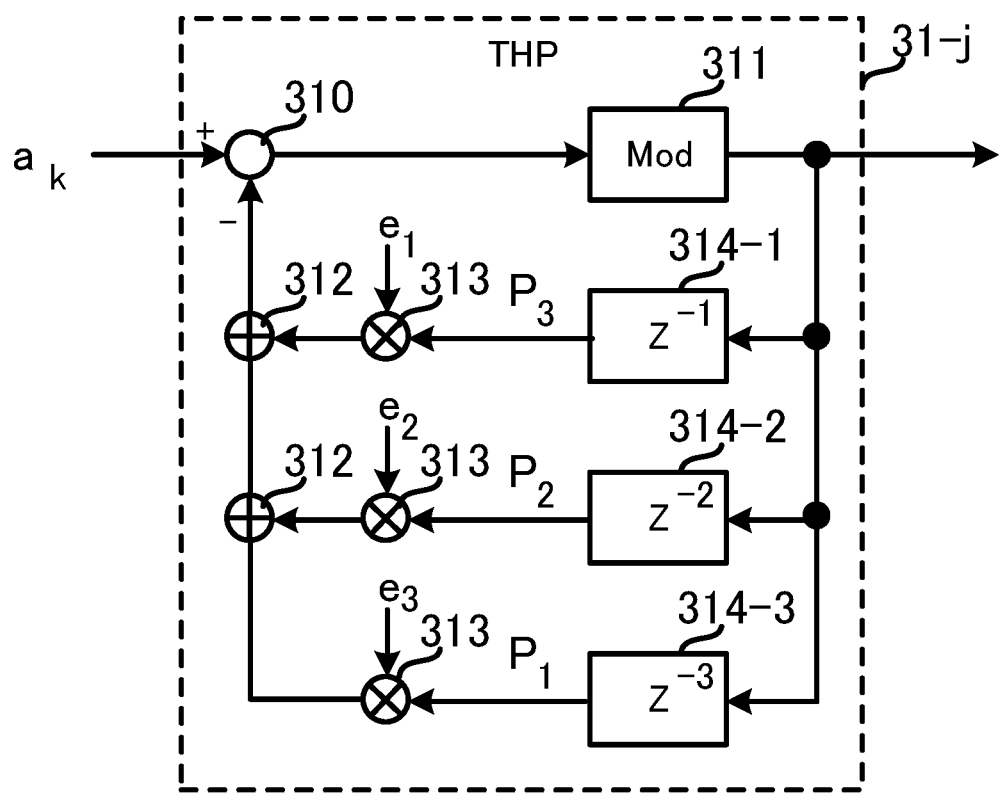
FIG. 15 is a diagram illustrating a state where a subsequent symbol of the redundant pilot symbol is input to a THP operation unit.

FIG. 15 is a diagram illustrating a state where a subsequent symbol $a_k$ of the redundant pilot symbol $P_3$ is input to the THP operation unit 31-$j$. At this time, the immediately preceding redundant pilot symbol $P_3$ is input from the delay generator 314-1 to the multiplier 313, and the redundant pilot symbol $P_2$ is input from the delay generator 314-2 to the multiplier 313. The head redundant pilot symbol $P_1$ is input from the delay generator 314-3 to the multiplier 313. Thereby, the THP precoded redundant pilot symbols $P_1$ to $P_3$ are fed back to the symbol $a_k$.

Therefore, the inter-symbol interference of redundant pilot symbols $P_1$ to $P_3$ to symbol $a_k$ is reduced in this example as well.

In this example, the THP operation unit 31-$j$ precodes the redundant pilot symbols $P_1$ to $P_3$, but it is not necessary to precode in order to save the time for the precoding process. In this case, the symbol insertion unit 103 may duplicate the redundant pilot symbols $P_1$ to $P_3$ and impart them to the beginning of each of the data blocks A #1 to A #m in order to improve the resistance of the inter-symbol interference of the redundant pilot symbols $P_1$ to $P_3$.

Figure 16:
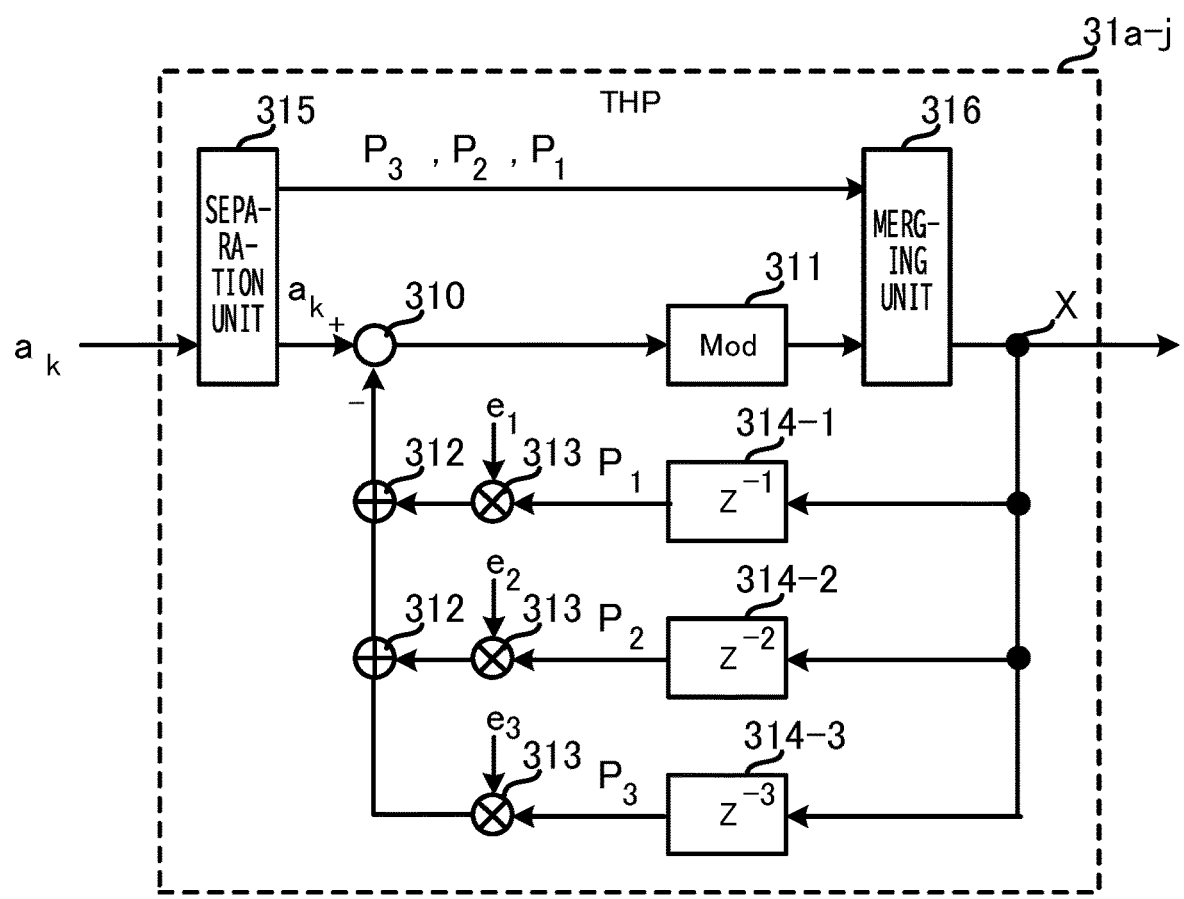
FIG. 16 is a block diagram illustrating another example of the THP operation unit.

FIG. 16 is a block diagram illustrating another example of the THP operation unit 31-$j$. In FIG. 16, the configurations common to those in FIG. 4 are designated by the same reference numerals, and the description thereof will be omitted.

The THP operation unit 31$a$-$j$ includes the addition unit 310, the modulo operation unit 311, the delay generators ($Z^{-1}$ to $Z^{-3}$) 314-1 to 314-3, multipliers 313, adders 312, a separation unit 315, and a merging unit 316. The number of multipliers 313 and adders 312 equals to THP tap length. The separation unit 315 separates the redundant pilot symbols $P_1$ to $P_3$ from the data block A #$j$ and outputs them to the merging unit 316. At this time, the separation timing of the redundant pilot symbols $P_1$ to $P_3$ is notified from, for example, the control unit 33 to the separation unit 315.

The merging unit 316 is connected between the modulo operation unit 311 and a branch point X from the output of the modulo operation unit 311 to the delay generators 314-1 to 314-3. When the head symbol $a_k$ is output from the modulo operation unit 311, the merging unit 316 merges the redundant pilot symbols $P_1$ to $P_3$ into the output from the modulo operation unit 311 so that the redundant pilot symbols $P_1$ to $P_3$ are positioned immediately before the symbol $a_k$.

According to this configuration, the redundant pilot symbols $P_1$ to $P_3$ can bypass the addition unit 310 and the modulo operation unit 311, so that the THP operation unit 31$a$-$j$ can omit the precoding of the redundant pilot symbols $P_1$ to $P_3$. Since the redundant pilot symbols $P_1$ to $P_3$ are input from the merging unit 316 to the delay generators 314-1 to 314-3, the redundant pilot symbols $P_1$ to $P_3$ are fed back to the head symbol $a_k$ as in the above example.

Figure 17:
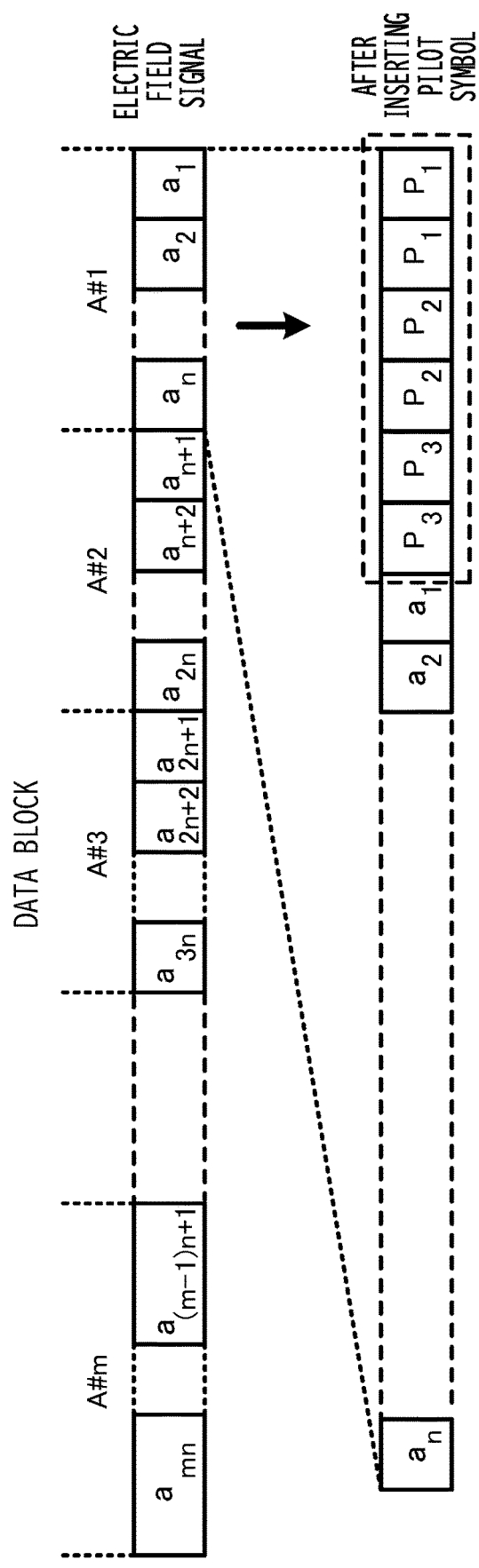
FIG. 17 is a diagram illustrating another example of the operation of the symbol insertion unit.

FIG. 17 is a diagram illustrating another example of the operation of the symbol insertion unit 103. In FIG. 17, the configurations common to those in FIG. 11 are designated by the same reference numerals, and the description thereof will be omitted. In this example, the illustration of the insertion of the pilot symbols P and the training symbols is omitted.

The symbol insertion unit 103 duplicates the redundant pilot symbols $P_1$ to $P_3$, and imparts two sets of redundant pilot symbols $P_1$ to $P_3$ to the beginning of the data blocks A #1 to A #m so that two sets of each of the redundant pilot symbols $P_1$ to $P_3$ are adjacent to each other. In this way, the symbol insertion unit 103 imparts two sets of the redundant pilot symbols $P_1$ to $P_3$ so that two pieces of each of the redundant pilot symbols $P_1$ to $P_3$ are adjacent to each other. Therefore, the redundant pilot symbols $P_1$ to $P_3$ are doubled to improve the resistance of the inter-symbol interference. The symbol insertion unit 103 may three sets or more of the redundant pilot symbols $P_1$ to $P_3$ so that three pieces or more of each of the redundant pilot symbols $P_1$ to $P_3$ are adjacent to each other.

Instead of duplicating the pilot symbols $P_1$ to $P_3$, it is also possible to improve the resistance to the inter-symbol interference by including the data value "0" in the beginning of the pilot symbols $P_1$ to $P_3$.

Figure 18:
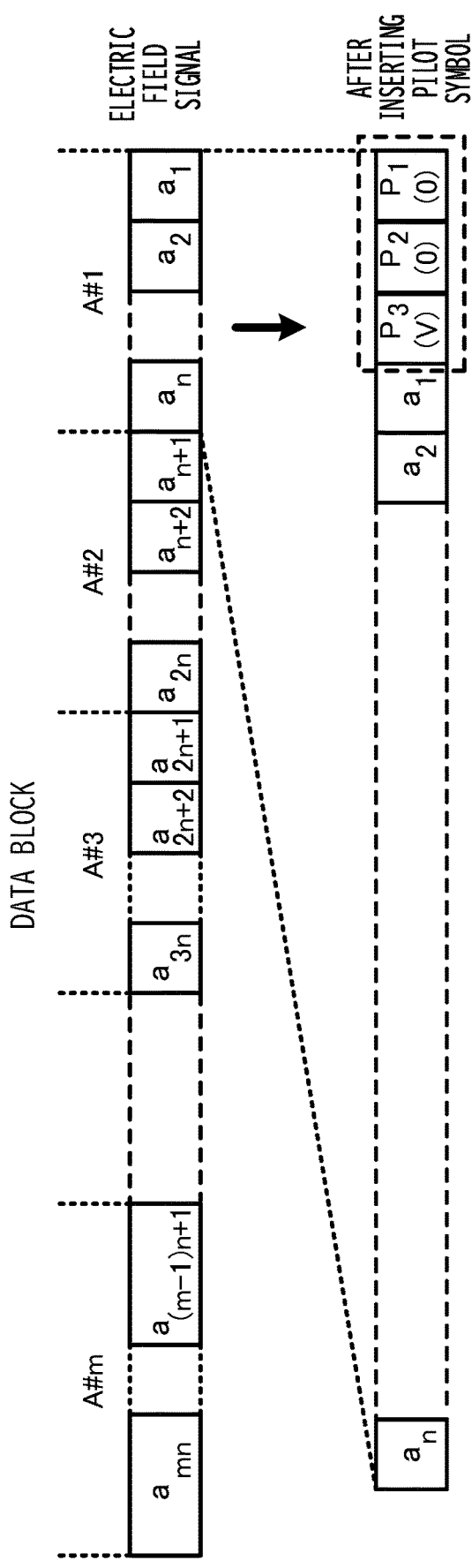
FIG. 18 is a diagram illustrating another example of the operation of the symbol insertion unit.

FIG. 18 is a diagram illustrating another example of the operation of the symbol insertion unit 103. In FIG. 18, the configurations common to those in FIG. 11 are designated by the same reference numerals, and the description thereof will be omitted. In this example, the illustration of the insertion of the pilot symbols P and the training symbols is omitted.

The symbol insertion unit 103 imparts the redundant pilot symbols $P_1$ to $P_3$ to the beginning of each of the data blocks A #1 to A #m. The data values of the redundant pilot symbols $P_1$ and $P_2$ are "0", and the data value of redundant pilot symbol $P_3$ is V ($\neq$0). As described above, when the data values of the head redundant pilot symbols $P_1$ and $P_2$ are "0", the inter-symbol interference does not substantially occur from the redundant pilot symbols $P_1$ and $P_2$ to the redundant pilot symbols $P_3$.

Therefore, "0" is included at the beginning portion of the redundant pilot symbols $P_1$ to $P_3$, so that the resistance of the inter-symbol interference of the redundant pilot symbols $P_1$ to $P_3$ can be improved.

(Signal Level)

The symbol insertion unit 103 generates the pilot symbols P, the redundant symbols $R_1$ to $R_3$ and the redundant pilot symbols $P_1$ to $P_3$, for example, as a QPSK signal having the low number of multi-levels. When the pilot symbols P, the redundant symbols $R_1$ to $R_3$, and the redundant pilot symbols $P_1$ to $P_3$ are precoded by the THP operation unit 31-1 to 31-$m$, the signal level is increased by the processing of the modulo operation unit 311. When the output value of the modulo operation unit 311 is set in a range of M, the signal level of the QPSK signal increases to a range of ±2M.

In contrast, the symbol insertion unit 103 sets the amplitude of the QPSK signal so that the QPSK signal becomes, for example, the 16QAM signal by the processing of the modulo operation unit 311.

Figure 19:
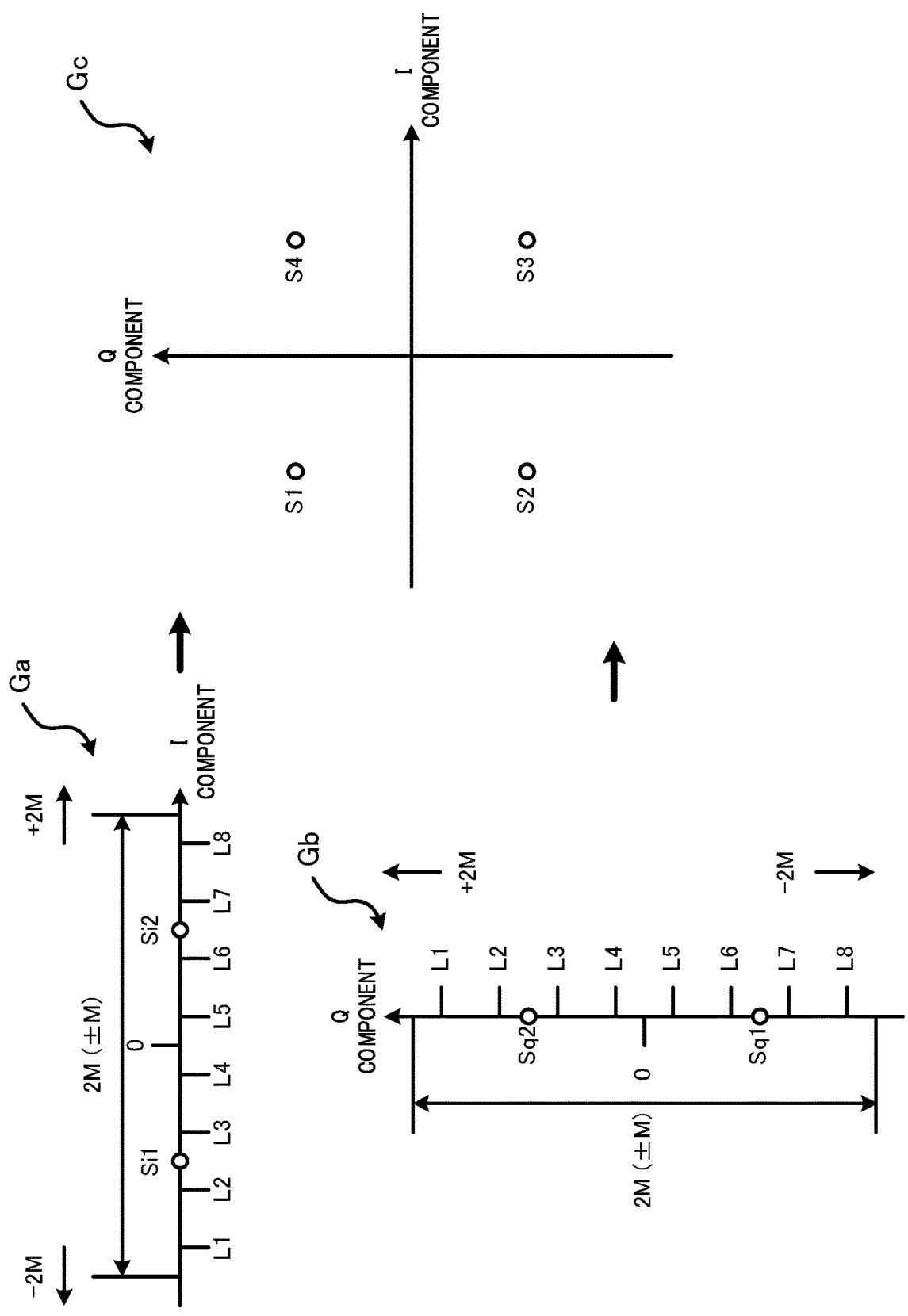
FIG. 19 is a diagram illustrating an example of setting an amplitude of a pilot QPSK (Quadrature Phase Shift Keying) signal.

FIG. 19 is a diagram illustrating an example of setting the amplitude of the pilot QPSK signal. A sign Ga indicates the I component of the QPSK signal, and a sign Gb indicates the Q component of the QPSK signal. Here, L1 to L8 are setting values that can be taken by the 64QAM signal, and are set at equal intervals around 0.

The symbol insertion unit 103 sets amplitude values Si1 and Si2 of the I component of the QPSK signal at the midpoint between L2 and L3 and the midpoint between L6 and L7, respectively. Further, the symbol insertion unit 103 sets amplitude values Sq1 and Sq2 of the Q component of the QPSK signal at the midpoint between L2 and L3 and the midpoint between L6 and L7, respectively. The amplitude of the QPSK signal is M/2. Thereby, the symbols S1 to S4 set on the constellation of QPSK are generated, as indicated by the sign Gc.

When the THP operation units 31-1 to 31-$m$ precode the symbols Si to S4, the symbols Si to S4 are converted into the 16QAM signal according to the amplitude values Si1 and Si2 of the I component and the amplitude values Sq1 and Sq2 of the Q component by increasing the signal level within the range of ±2M.

Figure 20:
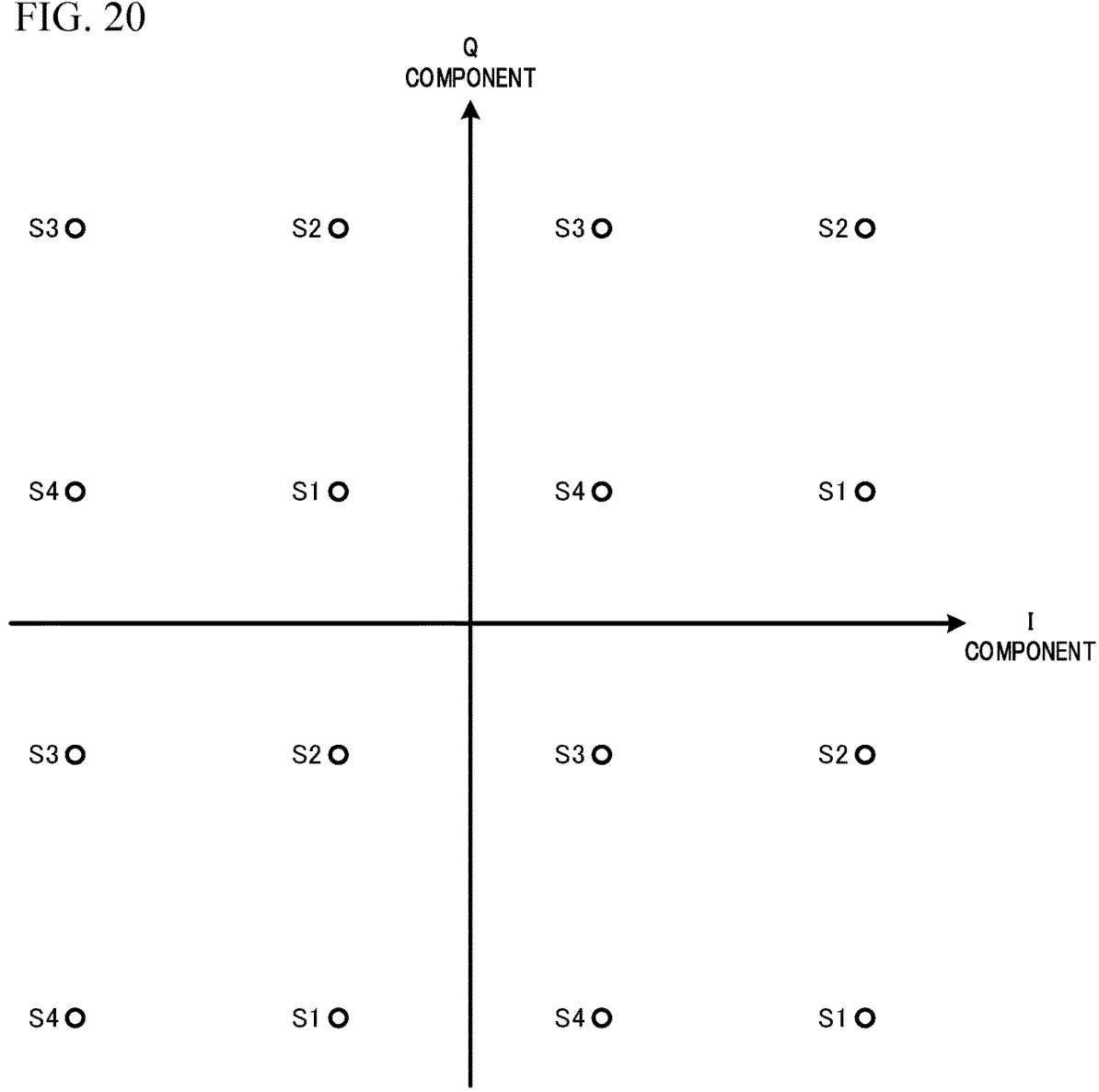
FIG. 20 is a diagram illustrating the constellation of a 16QAM signal.

FIG. 20 is a diagram illustrating the constellation of the 16QAM signal. The symbols Si to S4 of the QPSK signal are converted to the symbols Si to S4 of each quadrant of the 16QAM signal.

Therefore, for example, when the adaptive equalization unit 201c and the phase noise compensation unit 201d perform compensation using the pilot symbols P or redundant pilot symbols $P_1$ to $P_3$, they perform the processing using an algorithm corresponding to the 16QAM signal instead of the QPSK signal. In this example, the QAM signal is converted to the 16QAM signal, but the QAM signal can also be converted into a 36QAM signal. In this case, the adaptive equalization unit 201c and the phase noise compensation unit 201d execute the processing by the algorithm corresponding to the 36QAM signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A transmission device comprising:
   an imparter configured to impart redundant data to the beginning of each of a plurality of data blocks divided from a data signal;
   a plurality of THP operators configured to parallelly precode the plurality of data blocks to which the redundant data is imparted;
   a transmitter configured to sequentially transmit the plurality of data blocks precoded by the plurality of THP operators and the redundant data imparted to each of the plurality of data blocks to a transmission line according to an arrangement order in the data signal;
   wherein the plurality of THP operators feed back a plurality of pieces of the redundant data to the plurality of data blocks, respectively.

2. The transmission device as claimed in claim 1, wherein the plurality of THP operators precode the plurality of data blocks and the plurality of pieces of the redundant data, respectively.

3. The transmission device as claimed in claim 1, wherein the plurality of THP operators exclude the plurality of pieces of the redundant data from the precoding, and the imparter duplicates the plurality of pieces of the redundant data, and imparts the plurality of pieces of the redundant data and a plurality of pieces of duplications of the redundant data to the beginnings of the plurality of data blocks, respectively, each of the plurality of pieces of the redundant data and each of the plurality of pieces of duplications of the redundant data being adjacent to each other.

4. The transmission device as claimed in claim 1, wherein the plurality of THP operators exclude the plurality of pieces of the redundant data from the precoding, and the imparter imparts the plurality of pieces of the redundant data to the beginnings of the plurality of data blocks, respectively, each of the plurality of pieces of the redundant data including 0 in the beginning thereof.

5. The transmission device as claimed in claim 1, wherein the imparter imparts the plurality of pieces of the redundant data to the beginnings of the plurality of data blocks, respectively, each of the plurality of pieces of the redundant data including compensation information regarding compensation of the quality of the data signal transmitted through the transmission line.

6. A transmission method comprising:
   imparting redundant data to the beginning of each of a plurality of data blocks divided from a data signal;
   parallelly precoding the plurality of data blocks to which the redundant data is imparted;
   sequentially transmitting the plurality of data blocks precoded by the precoding and the redundant data imparted to each of the plurality of data blocks to a transmission line according to an arrangement order in the data signal;
   wherein the precoding feeds back a plurality of pieces of the redundant data to the plurality of data blocks, respectively.

7. The transmission method as claimed in claim 6, wherein the precoding precodes the plurality of data blocks and the plurality of pieces of the redundant data.

8. The transmission method as claimed in claim 6, wherein the precoding exclude the plurality of pieces of the redundant data, and the imparting duplicates the plurality of pieces of the redundant data, and imparts the plurality of pieces of the redundant data and a plurality of pieces of duplications of the redundant data to the beginnings of the plurality of data blocks, respectively, each of the plurality of pieces of the redundant data and each of the plurality of pieces of duplications of the redundant data being adjacent to each other.

9. The transmission method as claimed in claim 6, wherein the precoding exclude the plurality of pieces of the redundant data, and the imparting imparts the plurality of pieces of the redundant data to the beginnings of the plurality of data blocks, respectively, each of the plurality of pieces of the redundant data including 0 in the beginning thereof.

10. The transmission method as claimed in claim 6, wherein the imparting imparts the plurality of pieces of the redundant data to the beginnings of the plurality of data blocks, respectively, each of the plurality of pieces of the redundant data including compensation information regarding compensation of the quality of the data signal transmitted through the transmission line.

* * * * *